US011257376B2

(12) United States Patent
Fukumori et al.

(10) Patent No.: US 11,257,376 B2
(45) Date of Patent: Feb. 22, 2022

(54) MOBILE BODY DISTRIBUTION SITUATION FORECAST DEVICE AND MOBILE BODY DISTRIBUTION SITUATION FORECAST METHOD

(71) Applicant: HONDA MOTOR CO., LTD., Tokyo (JP)

(72) Inventors: Minoru Fukumori, Tokyo (JP); Yoshiaki Sugimoto, Tokyo (JP); Tadashi Kurihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 16/759,941

(22) PCT Filed: Sep. 18, 2018

(86) PCT No.: PCT/JP2018/034370
§ 371 (c)(1),
(2) Date: Apr. 28, 2020

(87) PCT Pub. No.: WO2019/087595
PCT Pub. Date: May 9, 2019

(65) Prior Publication Data
US 2020/0342765 A1    Oct. 29, 2020

(30) Foreign Application Priority Data
Nov. 6, 2017    (JP) .............................. JP2017-213953

(51) Int. Cl.
*G08G 1/13*    (2006.01)
*G01C 21/36*    (2006.01)
*G08G 1/00*    (2006.01)

(52) U.S. Cl.
CPC ......... *G08G 1/205* (2013.01); *G01C 21/3694* (2013.01); *G08G 1/13* (2013.01)

(58) Field of Classification Search
CPC ............ G08G 1/01; G08G 1/13; G08G 1/017; G08G 1/056; G01C 21/36; G01C 21/26; G01C 21/00; G06Q 50/10
See application file for complete search history.

(56) References Cited

U.S. PATENT DOCUMENTS

2001/0020211 A1*   9/2001  Takayama .......... G01C 21/3626
                                                                701/410
2009/0312946 A1    12/2009  Yoshioka et al.
(Continued)

FOREIGN PATENT DOCUMENTS

JP      2012-018088       1/2012
JP      2015-170059       9/2015
(Continued)

OTHER PUBLICATIONS

International Search Report, dated Dec. 25, 2018, 1 page.

*Primary Examiner* — Tan Q Nguyen
(74) *Attorney, Agent, or Firm* — Rankin, Hill & Clark LLP

(57) ABSTRACT

Forecasting a mobile body distribution situation after a prescribed time by forecasting an excursion action of a mobile body on the basis of an inter-facility movement correlation of the mobile body. A server system includes an inter-facility movement computation part for computing a facility staying time estimate, an inter-facility movement time estimate, and an inter-facility movement correlation on the basis of a trend in past position information from the mobile body, a plurality of pieces of facility information, and map information wherein a road map is included; a receiving part for receiving present position information of a plurality of the mobile bodies; and a mobile body distribution situation forecast part for forecasting the distribution situation of the mobile bodies after a prescribed time on the basis of (Continued)

the inter-facility movement correlation and the present position information of the plurality of mobile bodies.

8 Claims, 11 Drawing Sheets

(56) References Cited

U.S. PATENT DOCUMENTS

| | | | | |
|---|---|---|---|---|
| 2010/0138140 A1* | 6/2010 | Okuyama | ............... | G01C 21/32 |
| | | | | 701/117 |
| 2015/0032366 A1* | 1/2015 | Man | ....................... | H04W 4/024 |
| | | | | 701/412 |
| 2017/0132475 A1* | 5/2017 | Oami | ....................... | G08G 1/005 |
| 2017/0255966 A1* | 9/2017 | Khoury | ................... | H04L 67/20 |
| 2018/0330225 A1* | 11/2018 | Zhuo | ..................... | H04W 4/027 |

FOREIGN PATENT DOCUMENTS

| | | |
|---|---|---|
| JP | 2017-027221 | 2/2017 |
| WO | 2008/050711 | 5/2008 |
| WO | 2016/002400 | 5/2017 |

\* cited by examiner

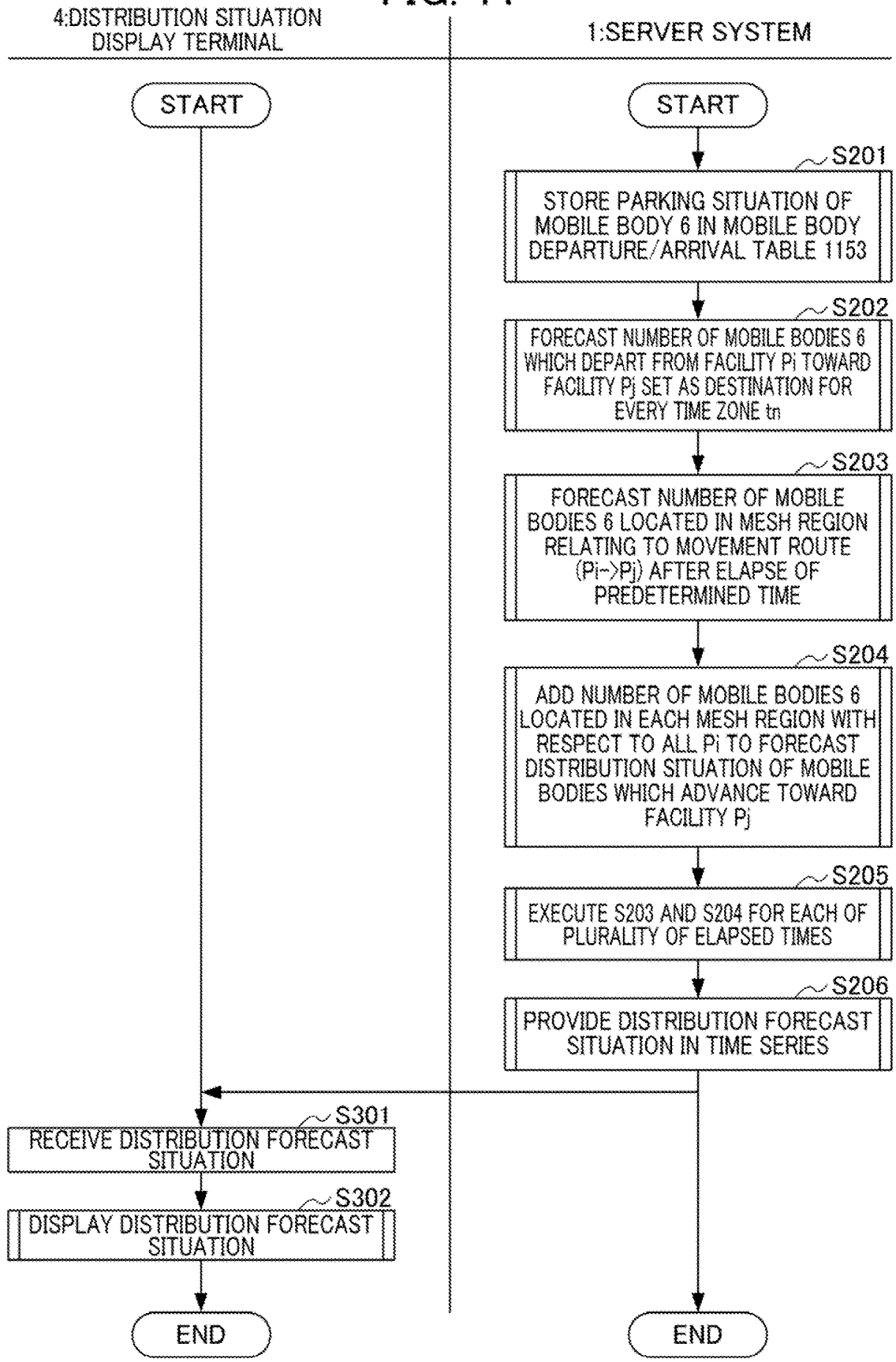

MOBILE BODY DISTRIBUTION SITUATION FORECAST DEVICE AND MOBILE BODY DISTRIBUTION SITUATION FORECAST METHOD

TECHNICAL FIELD

The present invention relates to a mobile body distribution situation forecast device that forecasts a mobile body distribution situation after a predetermined time by forecasting an excursion behavior of a mobile body on the basis of a mobile body distribution situation, particularly, an inter-facility movement correlation, and a mobile body distribution situation forecast method.

BACKGROUND ART

It is important for facilities such as restaurants and museums to know the number of visiting customers in advance for preparation. For this reason, in the related art, managers and clerks forecast the number of visiting customers on the basis of results on weekdays, weekends, holidays, and the like, or predict the number of visiting customers on the basis of past experiences according to changes in seasons, weather, or the like.

However, in the forecast method, a variation occurs in forecast accuracy, and it is difficult to cope with a sudden event such as opening of a nearby event.

In addition, in a case where a plurality of facilities exist in a predetermined area (for example, a tourist site area), there are many cases where a user performs an inter-facility movement to an additional facility B after staying at a facility A, but in the above-described method, it is difficult to forecast the number of visiting customers on the assumption of the inter-facility movement. In addition, it is difficult to take a measure for excursion of respective facilities in order to activate the economy in a predetermined area.

In this regard, Patent Document 1 discloses a configuration in which an inter-site correlation is displayed on map information by computing the inter-site correlation included in log information on the basis of log information acquired from a plurality of users.

Here, for example, the inter-site correlation includes a certainty factor indicating a probability that a user who has gone out to a site X as a destination migrates to a site Y as a destination (certainty factor C (X, Y)) in which the site X is set as a condition part and the site Y is set as a conclusion part), a co-occurrence frequency (=F(X, Y)) of the site X and the site Y which indicates the number of users who set both the site X and the site Y as a destination, and a support degree (=S(X, Y)) of the site X and the site Y which indicates a ratio of users who set both the site X and the site Y as a destination among total users.

Patent Document 1: Japanese Unexamined Patent Application, Publication No. 2017-027221

DISCLOSURE OF THE INVENTION

Problems to be Solved by the Invention

However, in the invention described in Patent Document 1, for example, in a tourist site area and the like, it is difficult for a manager or a clerk of a facility to forecast a mobile body distribution situation after a predetermined time on the basis of an inter-site correlation, and to forecast how many peoples will migrate to the facility or how many users will visit the facility after a predetermined time.

The invention has been made in consideration of such circumstances. An object of the invention is to provide a mobile body distribution situation forecast device that forecasts a mobile body distribution situation after a predetermined time by forecasting an excursion behavior of a mobile body on the basis of a mobile body distribution situation, particularly, an inter-facility movement correlation, and a mobile body distribution situation forecast method.

Means for Solving the Problems (1) According to an aspect of the invention, there is provided a mobile body distribution situation forecast device (for example, "server system 1" to be described later) including: an inter-facility movement computation unit (for example, "inter-facility movement computation unit 103" to be described later) that computes an estimated facility staying time, an estimated inter-facility movement time, and an inter-facility movement correlation on the basis of a trend of past position information from a mobile body (for example, "mobile body 6" to be described later), a plurality of pieces of facility information, and map information including a road map; a position information reception unit (for example, "reception unit 101" to be described later) that receives current position information of a plurality of the mobile bodies; and a mobile body situation forecast unit (for example, "mobile body distribution situation forecast unit 104" to be described later) that forecasts a mobile body distribution situation after a predetermined time on the basis of the inter-facility movement correlation and the current position information of the plurality of mobile bodies.

The mobile body distribution situation forecast device (for example, "server system 1" to be described later) in (1) forecasts the mobile body distribution after a predetermined time on the basis of the current position information of the plurality of mobile bodies, the inter-facility movement correlation. According to this, for example, in facilities such as a restaurant and a museum, a manager or a clerk can forecast the number of customers who visit after a predetermined time with accuracy.

(2) The mobile body distribution situation forecast device (for example, "server system 1" to be described later) according to (1) may further include a forecast situation output unit (for example, "forecast situation output unit 105" to be described later) that expresses the forecasted mobile body distribution situation after a predetermined time in a mesh shape and outputs the forecasted mobile body distribution situation in a state of being superimposed on the road map.

According to this, the manager or the clerk can visually understand an inter-facility excursion of a vehicle as if looking at a weather forecast map, and thus the manager or the clerk can forecast how many peoples will visit a facility after a predetermined time with accuracy.

(3) In the mobile body distribution situation forecast device (for example, "server system 1" to be described later) according to (1), the inter-facility movement computation unit (for example, "inter-facility movement computation unit 103" to be described later) may further compute the estimated facility staying time, the estimated inter-facility movement time, and the inter-facility movement correlation for every type of the mobile body, and the mobile body situation forecast unit (for example, "mobile body distribution situation forecast unit 104" to be described later) may further forecast the mobile body distribution situation after a predetermined time for every type of the mobile body.

According to this, in a case where it is assumed that another excursion behavior will be taken in correspondence with the type of the mobile body, the mobile body distribution situation after a predetermined time is forecasted for every type of the mobile body, and thus prediction accuracy can be further improved.

(4) In the mobile body distribution situation forecast device or example, "server system 1" to be described later) according to (3), the mobile body (for example, "mobile body 6" to be described later) may be a vehicle, and the type of the mobile body may be a vehicle type.

According to this, it is possible to obtain a similar effect as in the mobile body distribution situation forecast device in (3).

(5) According to another aspect of the invention, there is provided a mobile body distribution situation forecast method that is executed by a mobile body distribution situation forecast device (for example, "server system 1" to be described later). The method includes: an inter-facility movement computation step of computing an estimated facility staying time, an estimated inter-facility movement time, and an inter-facility movement correlation on the basis of a trend of past position information from a mobile body, a plurality of pieces of facility information, and map information including a road map; a position information reception step of receiving current position information of a plurality of the mobile bodies; and a mobile body situation forecast step of forecasting a mobile body distribution situation after a predetermined time on the basis of the inter-facility movement correlation and the current position information of the plurality of mobile bodies.

(6) The mobile body distribution situation forecast method according to (5) may further include an output step of expressing the mobile body distribution situation after a predetermined time which is forecasted in the mobile body situation forecast step in a mesh shape, and outputting the forecasted mobile body distribution situation in a state of being superimposed on the road map by the mobile body distribution situation forecast device.

(7) In the mobile body distribution situation forecast method according to (5), the mobile body distribution situation forecast device may further compute the estimated facility staying time, the estimated inter-facility movement time, and the inter-facility movement correlation for every type of the mobile body in the inter-facility movement computation step, and may further forecast the mobile body distribution situation after a predetermined time for every type of the mobile body in the mobile body situation forecast step.

(8) In the mobile body distribution situation forecast method according to (7), the mobile body may be a vehicle, and the type of the mobile body may be a vehicle type.

According to the method in (5) to (8), it is possible to obtain a similar effect as in the mobile body distribution situation forecast device in (1) to (4).

Effects of the Invention

According to the invention, it is possible to provide a mobile body distribution situation forecast device that forecasts a mobile body distribution situation after a predetermined time by forecasting an excursion behavior of a mobile body on the basis of a mobile body distribution situation, particularly, an inter-facility movement correlation, and a mobile body distribution situation forecast method.

BRIEF DESCRIPTION OF THE DRAWINGS

FIG. 11 is a flowchart illustrating a flow of processing by the server system 1.

PREFERRED MODE FOR CARRYING OUT THE INVENTION

First Embodiment

Hereinafter, a mobile body distribution situation forecast system 100 according to a preferred embodiment of the invention will be described with reference to the accompanying drawings.

[Functional Configuration of Mobile Body Distribution Situation Forecast System 100]

Figure 1:
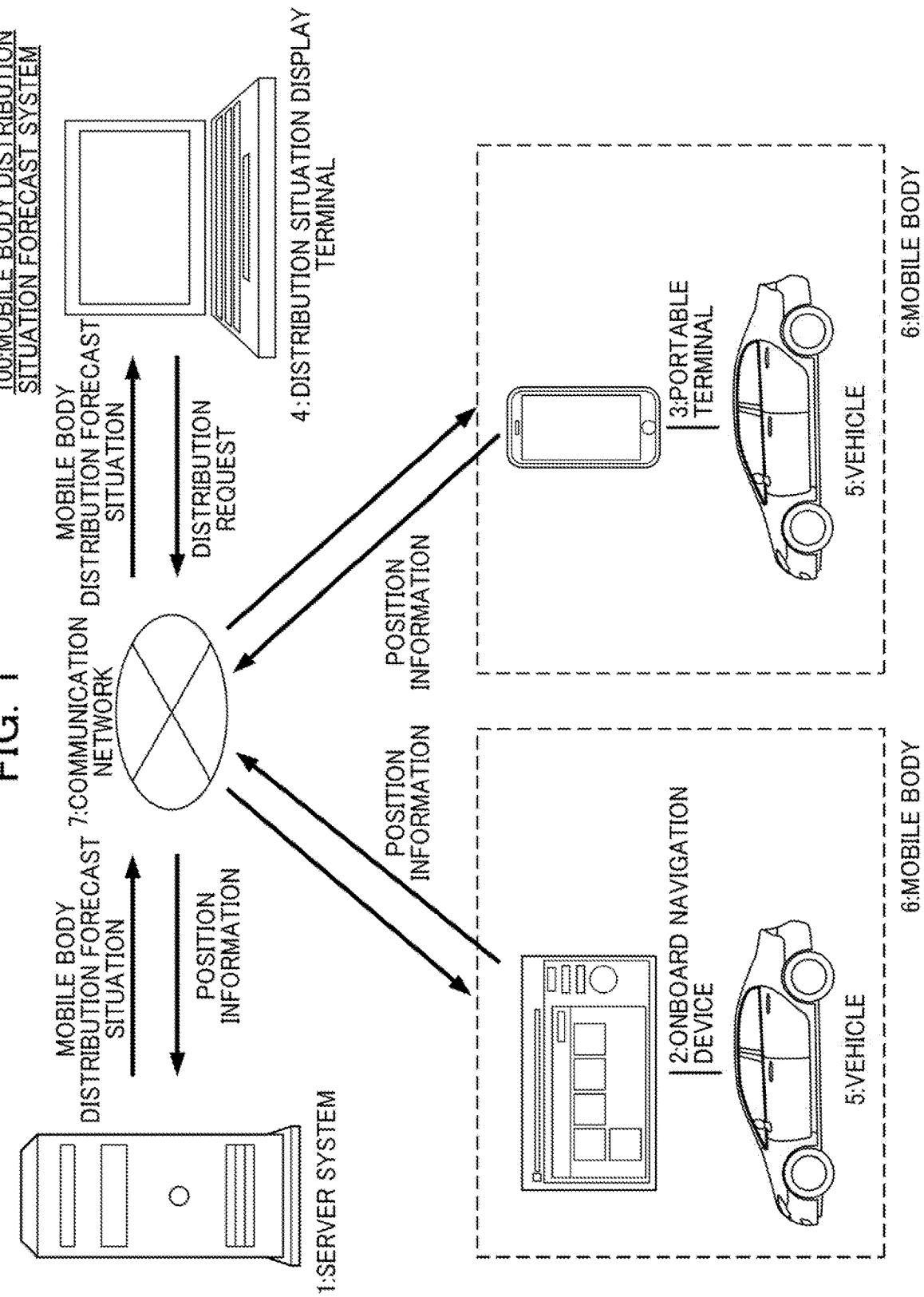
FIG. 1 is a view illustrating a system configuration of a mobile body distribution situation forecast system 100.

As illustrated in FIG. 1, a mobile body distribution situation forecast system 100 includes a server system 1, an onboard navigation device 2 mounted on a vehicle 5, a portable terminal 3, a distribution situation display terminal 4, and a communication network 7. Hereinafter, a vehicle 5 on which a communication device such as the onboard navigation device 2 is mounted, or a vehicle 5 including a portable terminal 3 that is signal-connected (paired) with the vehicle 5 is referred to as a mobile body 6. In addition, the onboard navigation device 2 of the mobile body 6 and the portable terminal 3 which perform communication with the server system 1 will be referred to as "mobile body 6" unless otherwise stated.

The server system 1 and the mobile body 6, and the server system 1 and the distribution situation display terminal 4 are connected in a communication possible manner through the communication network 7. The communication network 7 is realized by a network including the Internet and a mobile phone network in which a wired network, a wireless network, and the like are combined.

An outline of the mobile body distribution situation forecast system 100 is as follows.

The server system 1 performs transmission and reception of information with the onboard navigation device 2, the portable terminal 3, and the distribution situation display terminal 4 through a communication unit 12. The server system 1 forecasts a mobile body distribution situation after a predetermined time on the basis of inter-facility movement correlation information that is computed in advance, current position information of the mobile body 6, or the like. The server system 1 provides the mobile body distribution situation after elapse of a predetermined time, for example, forecast information relating to the number of mobile bodies 6 which visit a facility after a predetermined time with respect to a request from the distribution situation display terminal 4.

In the embodiment of the invention, the server system 1 is described as one server, but a distribution processing system in which respective functions of the server system 1 are appropriately distributed to a plurality of servers may be employed. In addition, the respective functions of the server system 1 may be realized by using a virtual server function or the like on a cloud.

The onboard navigation device 2 is a device that performs navigation (route guidance) with respect to a user who gets on the vehicle 5. The onboard navigation device 2 performs route guidance from a current position to a destination on the basis of a request of a user. In addition, the onboard navigation device 2 also has a function of measuring position information of the onboard navigation device 2 (that is, position information of the vehicle 5). The position information measured by the onboard navigation device 2 is appropriately transmitted to the server system 1.

The onboard navigation device 2 can be realized by a car navigation device that is provided in the vehicle 5 that is a mobile body, or a portable navigation device (PND) that is simply provided in a vehicle 60a that is a mobile body.

The portable terminal 3 is a portable terminal that is used by a user who gets on the vehicle 5. The portable terminal 3 has a function of measuring position information of the portable terminal 3 (that is, position information of the vehicle 5) as in the onboard navigation device 2. The position information measured by the portable terminal 3 is appropriately transmitted to the server system 1 as in the position information measured by the onboard navigation device 2.

The portable terminal 3 is a mobile phone, a smart phone, a tablet terminal, a PDA, a note-type computer, and other portable electronic devices, and includes an electronic device having a radio communication function.

The distribution situation display terminal 4 performs transmission and reception of information with the server system 1 through a communication unit 42. The distribution situation display terminal 4 can receives a distribution situation of the mobile body 6 after a predetermined time, particularly, the number of a plurality of the mobile bodies 6 which visits after a predetermined time from the server system 1.

More specifically, the distribution situation display terminal 4 displays a distribution forecast situation of the mobile body 6 on the basis of a user's request. The distribution forecast situation of the mobile body 6 is the number of the mobile bodies 6 which visit a plurality of forecasted facilities at the current time and after elapse of a constant time as described later, and the distribution situation display terminal 4 accumulates visiting information of the mobile bodies 6 at the current time and visiting forecast information after elapse of a constant time (a plurality of times) automatically or in correspondence with a user's operation in time series, and sequentially displays a plurality of pieces of the information.

Here, "after elapse of a constant time (plural)" represents, for example, a plurality of near futures from the current time such as T1 after elapse of a constant time from the current time T0, T2 after elapse of a constant time from T1, and T3 after elapse of a constant time from T2.

Next, respective configurations will be described.

Figure 2:
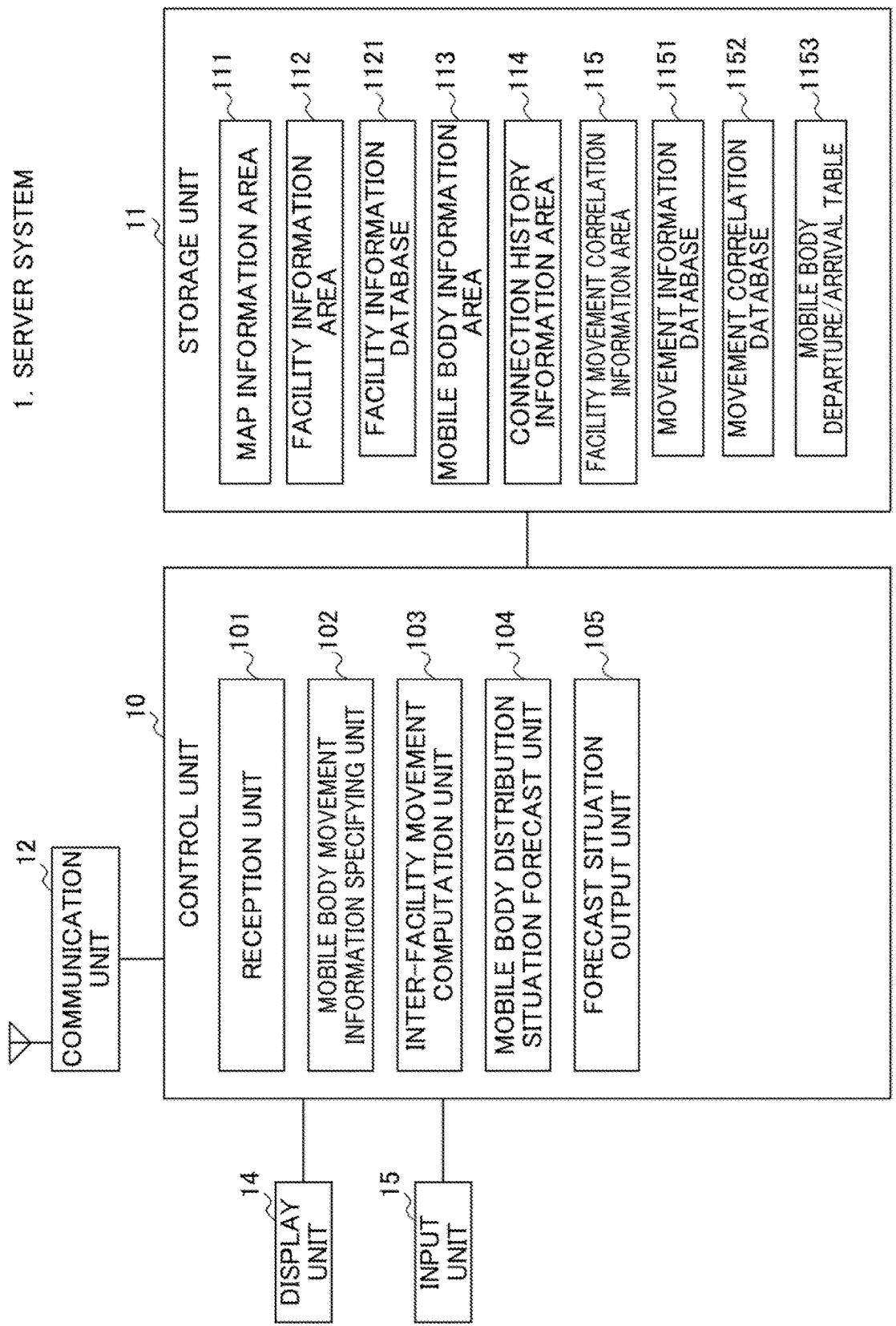
FIG. 2 is a view illustrating a configuration of a server system 1.

First, the server system 1 will be described. FIG. 2 illustrates a configuration of the server system 1.

<Server System 1>

As illustrated in FIG. 2, the server system 1 includes at least a control unit 10, a storage unit 11, and a communication unit 12, and includes a display unit 14 and an input unit 15 as necessary.

The control unit 10 is constituted by a processor including a CPU, a RAM, a ROM, an I/O, and the like, and performs control of respective constituent units. The CPU executes each program for mobile body distribution situation forecast which is read out from the RAM, the ROM, or the storage unit 11, reads out information from the RAM, the ROM, and the storage unit 11 in execution of the program, writes the information in the RAM and the storage unit 11, and transmits and receives a signal to and from the communication unit 12.

Details will be described later.

The storage unit 11 is constituted by a semiconductor memory, a hard disk drive, or the like, and stores an operating system (OS), software called an application, and various pieces of information. According to this, as illustrated in FIG. 2, various storage areas such as a map information area 111, a facility information area 112, a mobile body information area 113, a connection history information area 114, and a facility movement correlation information area 115 are secured in the storage unit 11.

Note that, in the storage unit 11, the storage areas may be individually secured, or a plurality of storage areas such as the map information area 111 and the facility information area 112 may be integrally constituted.

<Map Information Area 111>

Information on features such as a road and a facility, map information for navigation, road information, facility parking lot position information, parking lot position information, and the like are stored in advance in the map information area 111. The map information includes display map data for displaying backgrounds such as a road and a road map, position information of nodes (for example, an intersection, a bend point, an end point, and the like of a road) and type information thereof, position information of a link that is a route connecting respective nodes and type information thereof, road network data including link cost data relating to cost information of all links (for example, a distance, required time, and the like), and the like.

Information of a so-called road map such as a type of a road and a traffic signal is stored as the road information.

In the facility parking lot position information, position information of each facility parking lot is stored as latitude and longitude information.

<Analysis Target Area Map Data>

In addition, the map information may include map data for displaying a predetermined area (hereinafter, referred to as "analysis target area") that becomes a forecast target of the mobile body distribution situation. At this time, it is preferable to include facility display data for displaying a facility (hereinafter, also referred to as "analysis target facility") that is located within the analysis target area and is set as a target of the inter-facility movement correlation information.

Figure 3:
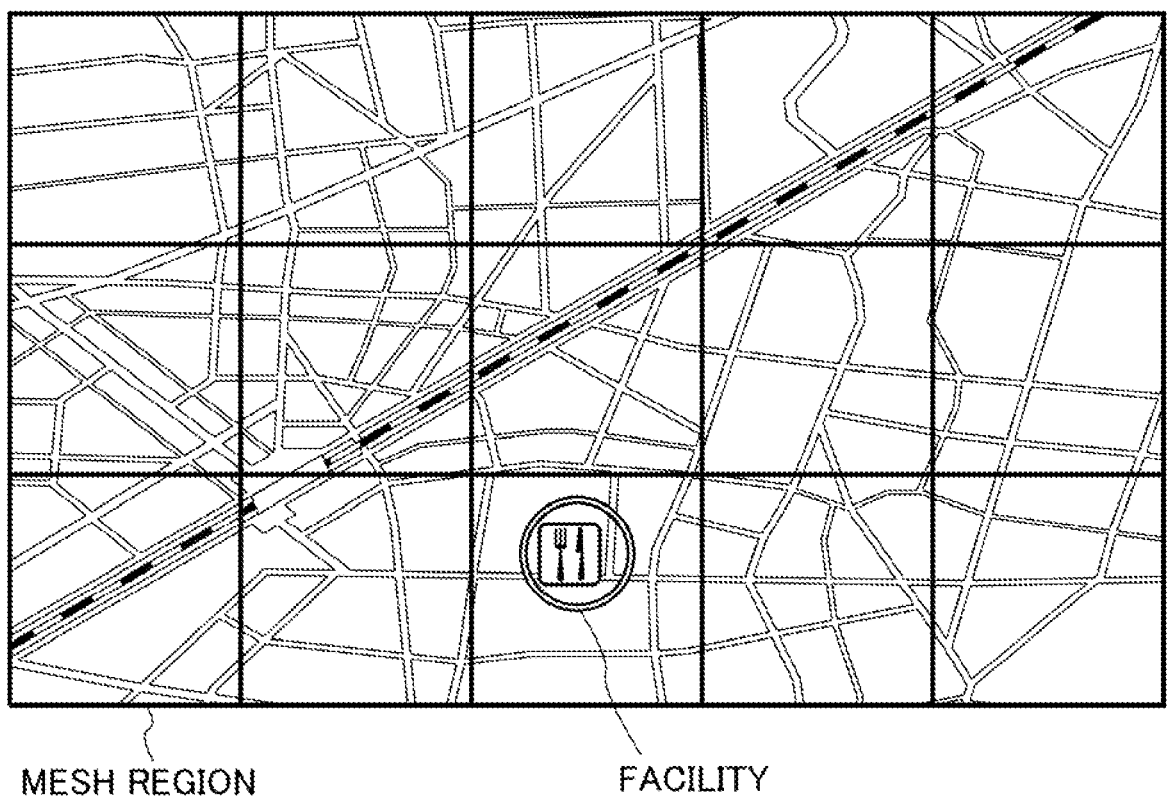
FIG. 3 is a view illustrating an example of a mesh region set on a map.

The map information area 111 includes mesh map information that is stored in a state of being divided into mesh regions at least as a map including a road map relating to the analysis target area. For example, each mesh region can be configured to be identified by central position information (latitude and longitude) of a corresponding mesh region. FIG. 3 illustrates an example of the mesh map information.

Here, as the size of the mesh region, for example, a plurality of types of mesh regions such as a section in which a length of each side is 10 km (hereinafter, referred to as "large mesh area"), a section having an area corresponding to one fourth of the area the large mesh area (a length of each side is 5 km corresponding to one second of the length of each side of the large mesh area, and a section having an area corresponding to one sixteenth of the area of the large mesh region (a length of each side is 2.5 km corresponding to one fourth of the length of each side of the large mesh region) (hereinafter, referred to as "small mesh region").

In addition, the size of the mesh region can be appropriately set in correspondence with the type of roads (a general road, a highway, and the like).

The mesh map information is stored in the map information area 111 for every mesh region size.

In addition, traffic information that is received from a traffic information center or the like may be stored in the map information area 111 in combination with a recording time at which the traffic information is received. For example, the traffic information includes elements determining the moving cost such as the number of travelling vehicles for every link, required travelling time, traffic congestion information, traffic regulation information, and weather information. In addition, past traffic information of the link and the like may be recorded.

<Facility Information Area 112>

The facility information area 112 includes a facility information database 1121 that stores information of each facility including facility identification information (facility ID), a name, a facility type (and/or genre), a telephone number, an address, a business hour, facility parking lot position information specified by latitude/longitude or the like, and a menu to be provided, facility information relating to a product service, a statistical index of a facility parking lot, free space information, coupon issue information, and the like in a case where a facility is a restaurant. The facility information is provided at any time in response to a request from the onboard navigation device 2, the portable terminal 3, or the like.

Here, the facility ID is unique identification information assigned to each facility. It is preferable that the facility ID is assigned to each facility type, and the ID is assigned in a hierarchical manner according to a genre in each facility type. Examples of the facility type include a store type such as a restaurant, a supermarket, and a sports gym. In addition, in a case where the facility type is a restaurant, examples of a classification according to a plurality of genres include genres based on the contents of provided food such as Japanese food, Chinese food, Western food, Italian, French, and a coffee shop, genres based on the viewpoint of speed and ease such as fast food, drive through, a ramen shop, a and family restaurant, and the like. Here, with regard to the genres, a plurality of genres can be assigned in combination in accordance with the content. Examples thereof include Western food and fast food. Note that, the facility type, the genre, and the like are not limited thereto.

In addition, the facility information database 1121 may store data indicating an analysis target facility as data independent from the facility ID or data included in the facility ID. According to this, the analysis target facility can be easily retrieved from the facility information database 1121.

<Mobile Body Information Area 113>

Information on the mobile body 6, for example, mobile body type information of the mobile body is stored in the mobile body information area 113. For example, the mobile body type information represents any one piece of information among vehicle category information, a vehicle type (vehicle type name), a grade that is a lower classification of the vehicle type, an exterior color, and the like. Here, for example, the category type represents a type such as a minivan and a sedan. For example, the vehicle type (vehicle type name) is a vehicle type name such as "Step Wagon (registered trademark)", and "Inspire (registered trademark)". The grade that is the lower classification of the vehicle type represents ranks (grades) classified into, for example, "pine", "bamboo", and "plum" on the basis of equipment and interior of a vehicle pertaining to the vehicle type. In addition, the exterior color that is the lower classification of the vehicle type represents an exterior color (body color) of the vehicle. Note that, the mobile body type information may include any one or all of the category type, the vehicle type name, and the lower classification of the vehicle type.

The information on the mobile body 6 which is stored in the mobile body information area 113 is uniquely managed by the identification information (hereinafter, also referred to as "mobile body ID") of the mobile body 6 for identifying each mobile body 6. Here, as the mobile body ID, numbers uniquely assigned to the onboard navigation device 2, the portable terminal 3, or the vehicle 5 can be used. For example, telephone numbers assigned to a SIM of a mobile phone network can be used as the mobile body ID. In addition, in a case of the vehicle 5, a vehicle identification number (VIN) uniquely assigned to the vehicle 5 or numbers of a number plate can be used as the mobile body ID. Note that, user information relating to a user who uses the mobile body 6 can be stored in association with the mobile body ID.

<Connection History Information Area 114>

Mobile body position information that is periodically transmitted from the mobile body 6 located in an area including at least the analysis target area in association with the mobile body ID, time information, or as options, a connection history record that manages destination information, an advancing direction of the mobile body 6, and the like for every mobile body ID are stored in the connection history information area 114. As the mobile body position information, current position information that is sequentially received from the mobile body 6 is stored. Note that, reception may be performed once every few seconds, or may be stored in time series on the mobile body side and may be collectively received at constant time or at timing when an application is activated on the mobile body side. Note that, a mesh region in which each vehicle is located can be determined on the basis of position information (attitude and longitude) of each vehicle travelling on a road.

In addition, the mobile body type information and a state of a mobile body (for example, an ignition-on state, a travelling state, an ignition-off state, or the like) transmitted from the mobile body 6 may be stored in the connection history record that is managed for every mobile body ID.

<Facility Movement Correlation Information Area 115>

The facility movement correlation information area 115 includes a movement information database 1151, a movement correlation database 1152, and a mobile body departure/arrival table 1153.

[Movement Information Database 1151]

All pieces of parking information (a facility ID of an analysis target facility, arrival date and time, parking time, and departure date and time) from a departure place to an arrival place of a plurality of unspecified mobile bodies 6, which are computed on the basis of a connection history record received in the past, are stored in the movement information database 1151 in association with a mobile body ID.

More specifically, it is assumed that an excursion state record, in which parking information of a parking lot of a facility (analysis target facility) where a departure site or an arrival site of the mobile body 6 is located in the analysis target area is aligned in the order of excursion of the same day, is stored in the movement information database 1151. Note that, details of a method of computing the excursion state record will be described later.

Accordingly, when the mobile body 6 moves from an analysis target facility A to another analysis target facility B, for example, even in a case where the mobile body 6 temporarily stops at a convenience store or a gas station, or temporarily parks for restroom rest, in a case where the convenience store, the gas station, or the like is not the analysis target facility, this case is not computed as parking information. Accordingly, for example, in a case of analyzing an excursion situation to the convenience store or the gas station, the convenience or the like may be set as an analysis target facility as necessary.

In addition, a mesh set on a map relating to an inter-facility movement route (excursion route) of the mobile body 6 from a facility Pi to a facility Pj, which is computed on the basis of the connection history record received in the past, is stored in the movement information database 1151. Here, the analysis target facility is identified with an index i, and is set as Pi ($1 \leq i \leq N$) (N is the number of analysis target facilities). Hereinafter, the inter-facility movement route (excursion route) from the facility Pi to the facility Pj is represented by R(Pi→Pj) ($i \neq j$). In addition, a mesh set on a map relating to the inter-facility movement route (excursion route) R(Pi→Pj) from the facility Pi to the facility Pj is assigned with an index in the order of movement, and a mesh including the departure facility Pi is set as M(Pi→Pj) (0), and a mesh including the target facility Pj is set as M(Pi→Pj) (K+1), and is expressed by {M(Pi→Pj) (k):$0 \leq k \leq K+1$}. Note that, K+2 is the number of mesh sets on a map relating to the inter-facility movement route (excursion route) R(Pi→Pj) from the departure facility Pi to the arrival facility Pj.

In a case where a plurality of inter-facility movement routes (excursion routes) R(Pi→Pj) from the facility Pi to the facility Pj exist, and another mesh set exists as the mesh set on a map relating to the inter-facility movement route (excursion route) R(Pi→Pj), for example, it is preferable that each of the mesh sets is identified by the inter-facility movement route (excursion route) R(Pi→Pj), and is stored in the movement information database 1151. According to this, in a case where a plurality of mesh sets exist, the mesh sets can be individually processed.

As described above, as the size of the mesh regions, for example, a plurality of kinds of mesh regions such as a large mesh region in which a length of each side is 10 km, a mesh region (a length of each side is 5 km) having an area corresponding to one fourth of the area of the large mesh region, and a small mesh region having an area corresponding to one sixteenth of the area of the large mesh region (a length of each side is 2.5 km). Note that, the size of the mesh regions is not limited to the sizes.

In addition, the size of the mesh region can be appropriately set in correspondence with the type of roads (a general road, a highway, and the like). The mesh set on a map relating to the inter-facility movement route (excursion route) R(Pi→Pj) from the facility Pi to the facility Pj may be stored for every mesh region size.

[Movement Correlation Database 1152]

Inter-facility movement correlation information relating to an analysis target facility located in the analysis target area is stored in the movement correlation database 1152. Here, the inter-facility movement correlation information will be described. Note that, details of a method of computing the inter-facility movement correlation information will be described later.

Each analysis target facility located in the analysis target area is identified with an index i, and is set as Pi ($1 \leq i \leq N$). In addition, when the number of mobile bodies departed from the facility Pi in a time zone (represented by a variable x) of an arbitrary date is set as Nx(Pi), and among the mobile bodies departed from the facility Pi in the time zone x, the number of mobile bodies of which the subsequent destination (arrival place) is the facility Pj is set as Nx(Pi→Pj) ($i \neq j$), among the mobile bodies departed from the facility Pi in the time zone x, a ratio Cx(Pi, Pj) ($i \neq j$) of the mobile bodies of which a destination is the facility Pj is expressed by Expression (1).

$$Cx(Pi,Pj)=Nx(Pi \rightarrow Pj)/Nx(Pi) \qquad (1)$$

In addition, an average value of Cx(Pi, Pj) in an arbitrary combination of time zone (represented by a variable t) such as a season, a month, a day of the week, a weekday/holiday, and a time zone is represented by Ct(Pi, Pj), and is referred to as a certainty factor (=confidence) in which the facility Pi is set as a departure place and the facility Pj is set as a destination (arrival place) in the time zone t.

Here, for example, the magnitude of the time zone may be set to approximately 15 minutes to 30 minutes.

For example, in a case where holiday time zones are divided into predetermined time zones (for example, time zones 11:00 to 11:15, 11:15 to 11:30, . . . , 12:00 to 12:15, . . . , 12:45 to 13:00, and the like with intervals of 15 minutes), and the time zone 12:00 to 12:15 is represented by the variable t, an average value of Cx(Pi, Pj) in an individual holiday daytime zone (for example, 12:00 to 12:15) x within a predetermined period up to now is set as Ct(Pi, Pj), and is referred to as the certainty factor (=confidence) in which the facility Pi is a departure place and the facility Pj is a destination (arrival place) in a holiday daytime zone t. That is, for example, a probability in which the mobile body 6 that departs from the facility Pi as a departure place in the holiday daytime zone t sets the facility Pj as the subsequent destination can be assumed as Ct(Pi, Pj). Note that, when computing the certainty factor Ct(Pi, Pj), for example, the certainty factor Ct(Pi, Pj) may be computed by setting a total number of mobile bodies 6 which depart from the facility Pi in an daytime zone (for example, 12:00 to 12:15) x of an individual public holiday within a predetermined period up to now as a denominator, and by setting a total number of mobile bodies 6 in which the facility Pj is set as a destination (arrival place) as a numerator.

Here, examples of an arbitrary combination of time zone t such as a season, a month, a day of the week, a weekday/holiday, and a time zone include a predetermined time zone in Obon consecutive holidays, a predetermined time zone in Golden Week, a predetermined time zone in a summer vacation period, and the like, but there is no limitation thereto. The time zone can be appropriately set in consideration of characteristics of an analysis target area, or the like.

Similarly, an average required time until the mobile body 6 arrives at the facility Pj after departing from the facility Pi in a time zone t is referred to as an inter-facility movement average time ("estimated inter-facility movement time") in the time zone t, and is represented by Tt(Pi→Pj) (i≠j). Note that, in a case where a plurality of inter-facility movement routes are used as an inter-facility movement route (excursion route) from the facility Pi to the facility Pj, the inter-facility movement average time (estimated inter-facility movement time) may be set for every inter-facility movement route. In addition, an inter-facility movement speed may be set in combination with the inter-facility movement average time (estimated inter-facility movement time) (or instead of the inter-facility movement average time (estimated inter-facility movement time)).

In addition, the inter-facility movement average time (estimated inter-facility movement time) or the inter-facility average movement speed may be assumed to be constant regardless of the time zone t.

Similarly, an average staying time (also referred to as "estimated facility staying time") of the mobile body 6 at the facility Pi in the time zone t is represented by St(Pi).

A certainty factor Ct(Pi, Pj) in which the mobile body 6 sets the facility Pi as a departure place and sets the facility Pj as a destination (arrival place) in an arbitrary combination time zone t such as a season, a month, a day of the week, a weekday/holiday, and a time zone, an inter-facility movement average time (estimated inter-facility movement time) Tt(Pi→Pj) of the mobile body 6 from the facility Pi to the facility Pj in the time zone t, and an average staying time (estimated facility staying time) St(Pi) of the mobile body 6 at the facility Pi in the time zone t are stored in the movement correlation database 1152 as the inter-facility movement correlation information.

In contrast, the certainty factor Ct(Pi, Pj) relating to the mobile body 6, the movement average time (estimated inter-facility movement time) Tt(Pi→Pj) or the inter-facility movement average speed, and the average staying time (estimated facility staying time) St(Pi) may be calculated for every mobile body type information, and may be stored as the inter-facility movement correlation information for every mobile body type information. For example, it is known that the mobile body 6 has a correlation with a family, a silver family, a youth, a woman, or the like in accordance with a vehicle category type or a vehicle type (vehicle type name). Accordingly, it can be expected that accuracy of forecasting of mobile body inter-facility excursion forecasting (mobile body distribution situation forecasting) in an analysis target area is improved by using the facility movement correlation information relating to the mobile body 6 for every mobile body type.

Note that, details of a method of computing the inter-facility movement correlation information will be described later.

[Mobile Body Departure/Arrival Table 1153]

A mobile body ID, an arrival time, and a departure time of the mobile body 6 that arrives at a facility parking lot for every analysis target facility (facility ID) are stored and managed in the mobile body departure/arrival table 1153. Processing relating to the mobile body departure/arrival table 1153 will be described later.

In a case of performing transmission and reception with the onboard navigation device 2 and the portable terminal 3, for example, the communication unit 12 implements a communication protocol capable of performing radio communication such as 3G and LTE.

The control unit 10 executes each program for mobile body inter-facility excursion forecasting and causes the server system 1 to function as a predetermined unit (hereinafter, collectively referred to as "mobile body inter-facility excursion forecasting unit").

In addition, the control unit 10 executes each program for mobile body inter-facility excursion forecasting to cause the server system 1 to execute a predetermined step (hereinafter, collectively referred to as "mobile body inter-facility excursion forecasting step").

Hereinafter, a function of the control unit 10 will be described from the viewpoint of the mobile body inter-facility excursion forecasting unit. Note that, description based on the viewpoints of the mobile body inter-facility excursion forecasting step (method) will be omitted because description can be made by substituting "unit" with "step".

As illustrated in FIG. 2, the control unit 10 includes a reception unit 101, a mobile body movement information specifying unit 102, an inter-facility movement computation unit 103, a mobile body distribution situation forecast unit 104, and a forecast situation output unit 105.

<Reception Unit 101>

The reception unit 101 executes log-in processing from the mobile body 6 (the onboard navigation device 2 or the portable terminal 3) to perform connection processing with the mobile body 6. Next, the reception unit 101 creates a connection history record for managing position information, mobile body type information, time information, an advancing direction, destination information, and the like which are transmitted from the mobile body 6 for every mobile body ID in the connection history information area 114.

According to this, the mobile body 6 may transmit position information measured by the vehicle 5 or the portable terminal 3 to server system 1 by adding a flag indicating that the position information is position information representing a departure position immediately after an activation switch of the vehicle 5 such as an ignition switch is turned on (an engine is activated) and the onboard navigation device 2 is automatically activated or immediately after the vehicle 5 and the portable terminal 3 are paired. According to this, the reception unit 101 can specify a departure position of the mobile body 6.

The reception unit 101 adds current position information, mobile body type information, time information, an advancing direction of the mobile body 6, and the like which are periodically transmitted from the mobile body 6 in the above-described connection history record for updating. Note that, the reception unit 101 may receive the mobile body position information, the time information, and the like from the mobile body 6 once for every several seconds, or the mobile body position information, the time information, and the like may be stored in time series on the mobile body 6 side and may be collectively received by the reception unit 101 for every constant time or at timing when an application is activated on the mobile body 6 side. In addition, for example, the mobile body type information may be transmitted only at the time of log-in.

The reception unit 101 adds the current position information, the time information, the advancing direction of the mobile body 6, and the like which are transmitted from the mobile body 6 when the ignition switch is turned off (engine stop) after the mobile body 6 arrives at a destination to the connection history record for updating.

Note that, the mobile body 6 may perform the transmission to the server system 1 by adding a flag indicating that position information measured immediately before the ignition switch is turned off (engine stop) indicates a parking position.

According to this, the reception unit 101 can specify a final position of the mobile body 6, that is, the parking position.

In addition, the reception unit 101 executes log-in processing from the distribution situation display terminal 4.

<Mobile Body Movement Information Specifying Unit 102>

The mobile body movement information specifying unit 102 specifies all pieces of movement information (a departure site, departure date and time, an arrival site, and arrival date and time) from a departure place to an arrival place of the mobile body 6 on the basis of ignition information and position information of the mobile body 6 from the past connection history record (within a predetermined period) stored in the connection history information area 114.

Specifically, with regard to the departure site of the mobile body 6, as described above, in a case where information indicating a departure position is included in the position information, the mobile body movement information specifying unit 102 can specify the departure site by the information. In addition, in a case where the information indicating the departure position is not included in the position information, the mobile body movement information specifying unit 102 may regard a position corresponding to position information received for the first time between initiation of transmission of the position information and termination thereof as the departure site.

In addition, with regard to a parking position of the mobile body 6, for example, as described above, in a case where information indicating the parking position is included in the position information, the mobile body movement information specifying unit 102 can specify the arrival site by the information. In addition, in a case where the information indicating the parking position is not included in the position information, the mobile body movement information specifying unit 102 may regard a position that is received finally between initiation of transmission of the position information and termination thereof, or a position that does not vary for a constant time as the arrival site.

Next, the mobile body movement information specifying unit 102 compares the specified arrival site and a facility parking lot position of analysis target facilities included in the map information area 111 with each other, and in a case where the specified arrival site and the facility parking lot position of any one of the analysis target facility match each other, the mobile body movement information specifying unit 102 can determine that this route is an outgoing way for visiting the analysis target facility.

In addition, the mobile body movement information specifying unit 102 compares the specified departure site and the facility parking lot position of analysis target facilities included in the map information area 111 with each other, and in a case where the specified departure site and the facility parking lot position of any one of the analysis target facilities match each other, the mobile body movement information specifying unit 102 can determine this route as a route when departing from the analysis target facility after visiting the analysis target facility.

As described above, the mobile body movement information specifying unit 102 can specify parking date and time at the facility parking lot of the analysis target facility excluding sites other than the analysis target area, a private parking lot such as a home and a monthly parking lot, and a parking lot other than the analysis target facility by sequentially processing the past connection history record (within a predetermined period) indicating route information from a departure position to a parking position of the mobile body 6 which is stored in the connection history information area 114 in accordance with time information. In addition, the mobile body movement information specifying unit 102 can calculate a parking time at the analysis target facility from a difference between the arrival time and the departure time. As described above, the mobile body movement information specifying unit 102 can specify parking information (a facility ID of an analysis target facility, arrival date and time, a parking time, and departure date and time) of the mobile body 6 at the facility parking lot of the analysis target facility.

The mobile body movement information specifying unit 102 stores the parking information (the facility ID of the analysis target facility, the arrival date and time, the parking time, and the departure date and time) of the mobile body 6 at the facility parking lot of the analysis target facility in the mobile body information area 113 in association with identification information (mobile body ID) of the mobile body 6.

Note that, the degree of matching between the departure position or the parking position, and the facility parking lot position may be arbitrarily determined. For example, in a case where the onboard navigation device 2 or the portable terminal 3 can measure position information with accuracy, a range of determination as matching may be narrowed. On the other hand, in a case where the onboard navigation device 2 or the portable terminal 3 cannot measure the position information at a certain degree of accuracy, the range of determination as matching may be widened.

The mobile body movement information specifying unit 102 can calculate an excursion state of the mobile body 6 to the analysis target facility on the same day by sorting the parking information (the facility ID of the analysis target facility, the arrival date and time, the parking time, and the departure date and time) of the mobile body 6 at the facility parking lot of the analysis target facility for every mobile body ID, for example, in the order of arrival date and time.

Specifically, in a case where the parking information (the facility ID of the analysis target facility, the arrival date and time, the parking time, and the departure date and time) in which the date of the arrival date and time is the same is aligned in the order of an arrival time, with regard to parking information in which the arrival date and the departure date are different from each other, the mobile body movement information specifying unit 102 determines that the facility is final excursion on the arrival date. In addition, in a case of detecting parking information in which the arrival date and time is the earliest on the arrival date, and pertains to the same day as the departure date and time, the mobile body movement information specifying unit 102 determines that a facility is an analysis target facility that is arrived for the first time on the day from a site other than the analysis target facility.

According to this, the mobile body movement information specifying unit 102 can extract inter-analysis-target-facility movement information for every mobile body ID and for every movement date in the order of time on the same day. At this time, the mobile body movement information specifying unit 102 can determine whether or not the analysis target facility is a lodging facility.

As an excursion pattern of the mobile body 6, the following cases are assumed.

Excursion Pattern 1: Case of arriving at an analysis target facility other than a lodging facility for the first time, excursing at the analysis target facility, and arriving at an analysis target facility that is the lodging facility.

Excursion Pattern 2: Case of departing from an analysis target facility that is a lodging facility, excursing at the analysis target facility, and arriving at an analysis target facility that is a lodging facility.

Excursion Pattern 3: Case of departing from an analysis target facility that is a lodging facility, excursing at the analysis target facility, and getting out from the analysis target facility, for example, toward a home or the outside of the analysis target area.

Excursion Pattern 4: Case of arriving at an analysis target facility other than a lodging facility for the first time, excursing at the analysis target facility, and getting out from the analysis target facility, for example, toward a home or the outside of the analysis target area.

As described above, the mobile body movement information specifying unit 102 can extract an inter-analysis-target-facility excursion state on the same day for every mobile body ID, can generate an excursion state record corresponding to an excursion pattern of the mobile body 6, and can store the excursion state record in the movement information database 1151.

Here, the excursion state record is a record in which parking information of analysis target facility in which the mobile body 6 excurses within an analysis target area is aligned in the order of time, for example, a record in the information is aligned in the order of (facility ID, *, *, and departure date and time), (facility ID, arrival date and time, a parking time, and departure date and time), and (facility ID, arrival date and time, *, and *).

Here, (facility ID, *, *, and departure date and time) represents a first analysis target facility (lodging facility) in Excursion Pattern 2 and Excursion Pattern 3, and * represents date and time and a lodging time before the previous day.

In addition, (facility ID, arrival date and time, a parking time, and departure date and time) represents a first analysis target facility in Excursion Pattern 1, or an analysis target facility during excursion.

In addition, (facility ID, arrival date and time, *, and *) represents a final analysis target facility (lodging facility) in Excursion Pattern 1 or Excursion Pattern 2, and * represents date and time and a lodging time after the next day.

[With Regard to Inter-Facility Movement Route (Excursion Route) R(Pi→Pj)]

In addition, the mobile body movement information specifying unit 102 extracts the inter-facility movement route (excursion route) R(Pi→Pj) in which a plurality of unspecified mobile bodies 6 set the facility Pi as a departure place and set the facility Pj as a destination (arrival) with reference to the connection history record in the past (within a predetermined period), and extracts a mesh set on a map relating to the inter-facility movement route (excursion route) R(Pi→Pj) from the facility Pi to the facility Pj.

Here, with regard to the extracted mesh set on a map relating to the inter-facility movement route (excursion route) from the facility Pi to the facility Pj, a mesh including the departure facility Pi is set as M(Pi→Pj) (0), an index is assigned in the order of movement, and a mesh including the target facility Pj is set as M(Pi→Pj) (L+1), and is represented by $\{M(Pi \to Pj)(k): 0 \leq k \leq L+1\}$.

The mobile body movement information specifying unit 102 stores the extracted mesh set $\{M(Pi \to Pj)(k): 0 \leq k \leq L+1\}$ on a map relating to the inter-facility movement route (excursion route) R(Pi→Pj) from the facility Pi to the facility Pj in the movement information database 1151 in association with the inter-facility movement route (excursion route) R(Pi→Pj).

Note that, in a case where a plurality of inter-facility movement routes (excursion routes) (Pi→Pj) from the facility Pi to the facility Pj exist, and another mesh set exists as a mesh set on a map relating to another inter-facility movement route, for example, each of the mesh sets may be identified by the inter-facility movement route (excursion route) R(Pi→Pj), and may be stored in the movement information database 1151. According to this, in a case where a plurality of mesh sets relating to the inter-facility movement route (excursion route) from the facility Pi to the facility Pj exist, processing can be performed by regarding the mesh sets as separate inter-facility movement routes (excursion routes).

In addition, in a case where a plurality of inter-facility movement routes R (Pi→Pj) from the facility Pi to the facility Pj exist, and another mesh set exists as a mesh set on a map relating to another inter-facility movement route, it is preferable that the mobile body movement information specifying unit 102 calculates a use ratio of each inter-facility movement route from the facility Pi to the facility Pj, and stores the use ratio in association with each inter-facility movement route (excursion route) R(Pi→Pj). According to this, in a case where a plurality of the mobile bodies 6 move to the facility Pj as a destination after departing from the facility Pi, it is possible to forecast the number of the mobile bodies 6 which use respective inter-facility movement routes.

<Inter-Facility Movement Computation Unit 103>

On the basis of the inter-analysis-target-facility excursion state record stored in the movement information database 1151 of all mobile bodies 6 on the same day, the inter-facility movement computation unit 103 computes the number of mobile bodies which departed from the facility Pi in a time zone (represented by a variable x) of an arbitrary date within a predetermined period (for example, within the past one year) as Nx(Pi), and computes the number of mobile bodies, in which the facility Pj is set as the subsequent destination (arrival place), in the Nx(Pi) as Nx(Pi→Pj).

Next, the inter-facility movement computation unit 103 computes a ratio of the mobile bodies in which the facility Pj is a destination among the mobile bodies departed from the facility Pi in the time zone x as Cx(Pi, Pj) on the basis of Nx(Pi) and Nx(Pi→Pj) with Expression (1).

Next, the inter-facility movement computation unit 103 computes an average value of Cx(Pi, Pj) in an arbitrary combination of time zone (represented by the variable t) such as such as a season, a month, a day of the week, a weekday/holiday, and a time zone which are included, for example, in a predetermined period on the basis of Cx(Pi, Pj) to compute a certainty factor Ct (Pi, Pj) in which the facility Pi is a departure place and the facility Pj is a destination (arrival place) in the time zone t. Examples of the time zone t include respective time zones on a holiday, respective time zones on a weekday, and respective time zones in an Obon holiday period, time zones on Monday, time zones on a summer holiday, and the like, but there is no limitation thereto.

According to this, the inter-facility movement computation unit 103 can compute the certainty factor of a mobile body that departs from the facility Pi as a departure site and sets the facility Pj as a destination (arrival place), for example, for every daytime zone on a holiday (for example, 12:45 to 13:00), for example, by dividing time zones on a holiday into predetermined time zones.

Similarly, the inter-facility movement computation unit 103 can compute an inter-facility movement average time (estimated inter-facility movement time) Tt(Pi→Pj) until the mobile body 6 arrives at the facility Pj after departing from the facility Pi in the time zone t within a predetermined period on the basis of the inter-analysis-target-facility excursion state record stored in the movement information database 1151 in the mobile body 6.

Note that, in a case where a plurality of inter-facility movement routes are used as the inter-facility movement route (excursion route) R(Pi→Pj) from the facility Pi to the facility Pj, and mesh sets corresponding to the inter-facility movement routes are different from each other, for example, the inter-facility movement computation unit 103 may compute a ratio of each inter-facility movement route R(Pi→Pj) used by the mobile body 6. In addition, the inter-facility movement computation unit 103 may compute an inter-facility movement average time (estimated inter-facility movement time) until the mobile body 6 arrives at the facility Pj after departing from the facility Pi in the time zone t within a predetermined period for every inter-facility movement route R(Pi→Pj).

In addition, the inter-facility movement computation unit 103 can compute an average staying time (estimated facility staying time) St(Pi) of the mobile body 6 at the facility Pi in the time zone t within a predetermined period on the basis of the inter-analysis-target-facility excursion state record of the mobile body 6 which is stored in the movement information database 1151.

Hereinbefore, the inter-facility movement computation unit 103 computes movement correlation information for all of the mobile bodies 6 regardless of the mobile body type information (for example, a vehicle category type or a vehicle type name) of the mobile bodies 6. However, as described above, the inter-facility movement computation unit 103 may compute the certainty factor Ct(Pi, Pj) relating to the mobile body 6, the movement average time (estimated inter-facility movement time) Tt(Pi→Pj), and the average staying time (estimated facility staying time) St(Pi) for every the mobile body type information, for example, for every the vehicle category type or the vehicle type (vehicle type name), and may store these values in the movement correlation database 1152 as inter-facility movement correlation information for every mobile body type information. According to this, it is possible to expect a further improvement the accuracy in the mobile body inter-facility excursion forecasting (mobile body distribution situation forecasting).

The inter-facility movement computation unit 103 stores the computed inter-facility movement correlation information in an arbitrary combination of time zone such as a season, a month, a day of the week, a weekday/holiday, and a time zone in the movement correlation database 1152. Note that, as described above, the computed inter-facility movement correlation information may be stored in the movement correlation database 1152 for every mobile body type information of the mobile body 6, for example, for every vehicle category type or vehicle type (vehicle type name). According to this, it is possible to expect a further improvement the accuracy in the mobile body inter-facility excursion forecasting (mobile body distribution situation forecasting).

Note that, it is preferable that the inter-facility movement computation unit 103 appropriately updates the inter-facility movement correlation information and the like on the basis of the excursion state record that is additionally stored in the movement information database 1151.

<Mobile Body Distribution Situation Forecast Unit 104>

The mobile body distribution situation forecast unit 104 detects a parking situation and a departure situation of the mobile body 6 at a facility parking lot of an analysis target facility from a connection history record of the day which is stored in the connection history information area 114 on the forecast day with a predetermined time interval (for example, a time interval corresponding to a width of the time zone t relating to the movement correlation information), and stores a mobile body ID, an arrival time, and a departure time of the mobile body 6 arrived at the facility parking lot in the mobile body departure/arrival table 1153 of the storage unit (the facility movement correlation information area 115) for every analysis target facility (facility ID).

The mobile body distribution situation forecast unit 104 can compute the number of mobile bodies 6 departed from each facility Pi for every time zone t with reference to the mobile body departure/arrival table 1153. Specifically, the mobile body distribution situation forecast unit 104 can compute the number of mobile bodies 6 departed from the facility Pi by extracting the mobile bodies 6 (mobile body ID) departed from the facility Pi for every predetermined time zone t up to the current time $t_0$ in the facility Pi. Hereinafter, the number of mobile bodies 6 departed from the facility Pi in a predetermined time zone t is represented by Nt(Pi→Out).

According to this, the mobile body distribution situation forecast unit 104 can forecast the number of mobile bodies 6 in excursion toward the facility Pj as a destination after departing from the facility Pi in a predetermined time zone t by integrating the certainty factor Ct(Pi, Pj) that is a ratio of a mobile body of which a destination is the facility Pj among mobile bodies (number Nt(Pi→Out) departed from the facility Pi. Hereinafter, when the number of mobile bodies 6 in excursion toward the facility Pj as a destination after departing from the facility Pi in a predetermined time zone t is set as Nt(Pi→Pj), Nt(Pi→Pj) is expressed by Expression (2).

$$Nt(Pi \to Pj) = Nt(Pi \to Out) \times Ct(Pi, Pj) \qquad (2)$$

On the other hand, the mobile body distribution situation forecast unit 104 can compute the number of mobile bodies 6 which depart from the facility Pi in a predetermined time zone t in the near future on the assumption that the mobile bodies 6 are scheduled to depart from the facility Pi after elapse of an average staying time after arriving at the facility Pi on the basis of an arrival time of the mobile body 6. Specifically, the mobile body distribution situation forecast unit 104 can forecast the number of mobile bodies 6 (Nt(Pi→Out)) which are scheduled to depart in a predetermined time zone t in the near future by adding an average staying time to the arrival time of the mobile bodies 6 with reference to the mobile body departure/arrival table 1153.

According to this, when the number of mobile bodies 6 which are forecasted to be in excursion toward the facility Pj as a destination after departing from the facility Pi in a predetermined time zone t in the near future is set as Nt(Pi→Pj), Nt(Pi→Pj) is expressed by Expression (2) as described above.

As described above, the mobile body distribution situation forecast unit 104 can forecast the number of mobile bodies 6 ($Nt_n$(Pi→Pj)) which are forecasted to be in excursion toward the facility Pj as a destination after departing from the facility Pi in respective time zones $t_{-n}$, $t_{-n+1}$, ..., $t_{-1}$, $t_0$, $t_1$, $t_2$, ... before and after the current time $t_0$.

Next, the mobile body distribution situation forecast unit 104 can forecast that a set of mobile bodies 6 which departed or are scheduled to depart from the facility Pi (i≠j) in a predetermined time zone $t_n$ will be located in which mesh region on the inter-facility movement route R(Pi→Pj) from the facility Pi to the facility Pj after elapse of a predetermined time from the current time $t_0$. In the following description, the set of the mobile bodies 6 which departed or are scheduled to depart from the facility Pi (i≠j) in a predetermined time zone $t_n$ is set as $C_n$, and a set of mobile bodies of which a destination is the facility Pj in the set $C_n$ is set as $C_n'$. The number of mobile bodies 6 pertaining to the set $C_n$ is $Nt_n$(Pi→Out). The number of mobile bodies 6 pertaining to the set $C_n'$ is Nt(Pi→Pj).

The mobile body distribution situation forecast unit 104 can specify mesh regions M(Pi→Pj) ($k_1$) and M((Pi→Pj) ($k_2$) ($k_2 \geq k_1$) on the inter-facility movement route R(Pi→Pj) which are located after elapse of a predetermined time from the current time $t_0$ on the basis of an elapsed time from a departure time (for example, with reference to an movement average time, a movement average speed, or the like) on the assumption that among mobile bodies 6 pertaining to the set $C_n$, a mobile body 6 that departed (or is scheduled to depart) for the first time or a mobile body 6 that departed (or is scheduled to depart) finally respectively head to the facility Pj.

Note that, in a case where the mobile body 6 is estimated to arrive at the facility Pj after elapse of a predetermined time, as a mesh region on an inter-facility movement route, the facility Pj is correlated.

According to this, the mobile body distribution situation forecast unit 104 can forecast that the number $Nt_n$(Pi→Pj) of mobile bodies 6 (mobile bodies 6 which departed or are scheduled to depart from the facility Pi (i≠j) in a predetermined time zone $t_n$) pertaining to the set $C_n'$ are located on a mesh region subset from a mesh region M(Pi→Pj) ($k_1$) to a mesh region M(Pi→Pj) ($k_2$) (hereinafter, simply referred to as "mesh region subset") which is a subset of the mesh set {M(Pi→Pj) (k): 0≤k≤L+1} on a map relating to the inter-facility movement route (excursion route) R(Pi→Pj) from the facility Pi to the facility Pj after elapse of a predetermined time from the current time $t_0$. Note that, it is preferable that the size of the mesh region is selected so that the size of the "mesh region subset" is two or less.

In addition, the mobile body distribution situation forecast unit 104 may allocate, for example, a numerical value obtained by dividing the number $Nt_n$ (Pi→Pj) by the size of the mesh region subset to respective mesh regions included in the mesh region subset. According to this, for example, in a case where the divided numerical value is set as an integer by rounding or the like, the total value is set to be equal to the number $Nt_n$(Pi→Pj).

When the above-described processing is performed with respect to respective time zones $t_n$ before and after the current time $t_0$ for every facility Pj, the mobile body distribution situation forecast unit 104 can forecast a distribution situation of the mobile body 6 in excursion on the inter-facility movement route (excursion route) R(Pi→Pj) from another facility Pi (i≠j) with an arbitrary facility Pj set as a destination after elapse of a predetermined time from the current time $t_0$.

That is, the mobile body distribution situation forecast unit 104 can forecast a distribution situation of the mobile body 6 in excursion on the inter-facility movement route (excursion route) R(Pi→Pj) from another facility Pi (i≠j) with a facility Pj set as a destination after elapse of a predetermined time from the current time $t_0$ by correlating the distribution situation to a mesh region included in the mesh set {M(Pi→Pj) (k): 0≤k≤L+1} on a map relating to the inter-facility movement route (excursion route) R(Pi→Pj) from the facility Pi to the facility Pj for every facility Pj.

As described above, the mobile body distribution situation forecast unit 104 stores the mobile body distribution forecast data forecasted for every facility Pj, in which the distribution forecast situation of mobile bodies 6 (for example, the number of the mobile bodies 6) in excursion on the inter-facility movement route (excursion route) R(Pi→Pj) from another facility Pi (i≠j) with the facility Pj set as a destination after elapse of a predetermined time from the current time $t_0$ is correlated to a mesh region on a map, in the facility movement correlation information area 115.

In addition, for example, the mobile body distribution situation forecast unit 104 can forecast the distribution situation of the mobile body 6 in excursion on the inter-facility movement route (excursion route) R(Pi→Pj) from another facility Pi (i≠j) with the facility Pj set as a destination in time series by performing the above-described processing at a plurality of times including the current time (for example, 0 minute, 15 minutes, 30 minutes, 45 minutes, 60 minutes, and the like) in the near future as a required time, and by referencing to the mobile body distribution forecast data created for elapse of each of the plurality of times with the facility Pj set as a destination.

The mobile body distribution situation forecast unit 104 can forecast the distribution situation of mobile bodies 6 in excursion from another facility Pi (i≠j) with the facility Pj set as a destination in time series by superimposing the mobile body distribution forecast data, in which the distribution forecast situation of the mobile bodies 6 in excursion on the inter-facility movement route (excursion route) R(Pi→Pj) from the facility Pi (i≠j) (for example, the number of the mobile bodies 6) is correlated to mesh regions on a map, on each other after elapse of the same time with respect to all facilities Pi having a movement correlation with the facility Pj set as a destination.

[Case Where Plurality of Inter-Facility Movement Routes Exist]

In a case where a plurality of inter-facility movement routes are used as the inter-facility movement route (excursion route) R(Pi→Pj) from the facility Pi to the facility Pj, and mesh sets corresponding to the inter-facility movement routes are different from each other, the mobile body distribution situation forecast unit 104 may compute the number of mobile bodies 6 for every inter-facility movement route with the facility Pj set as a destination by adding a use ratio of each of the inter-facility movement routes from the facility Pi to the facility Pj to the Nt(Pi→Pj). According to this, it is possible to compute the mobile body distribution forecast data for every inter-facility movement route (excursion route) R(Pi→Pj) from the facility Pi to the facility Pj.

Modification Example (Forecasting for Every Mobile Body Type Information

The mobile body distribution situation forecast unit 104 can forecast the distribution situation of the mobile body 6 in excursion from another facility Pi (i≠j) with an arbitrary facility Pj set as a destination after elapse of a predetermined time from the current time $t_0$ on the basis of inter-facility movement correlation information for every mobile body type information.

According to this, for example, in a case where it is known that the mobile body 6 has a correlation with a family, a silver family, a youth, a woman, or the like in accordance with a vehicle category type or a vehicle type (vehicle type name), it is possible to expect a further improvement of the accuracy in the mobile body inter-facility excursion forecasting (mobile body distribution situation forecasting) in an analysis target area.

<Forecast Situation Output Unit 105>

The forecast situation output unit 105 performs, for example, coloring with respect to each mesh region in correspondence with an excursion state, which is forecasted by the mobile body distribution situation forecast unit 104, of the mobile body 6 in each mesh region after a constant time, and provides the resultant excursion state to the distribution situation display terminal 4 through the communication unit 12. Specifically, the forecast situation output unit 105 provides, for example, the distribution forecast situation of the mobile body 6 in excursion from another facility Pi (i≠j) with a facility Pj set as a destination in time series for each of a plurality of times including the current time (for example, 15 minutes, 30 minutes, 45 minutes, 60 minutes, and the like) in the near future in response to a mobile body distribution situation distribution request from the distribution situation display terminal 4.

The forecast situation output unit 105 may generate, for example, a distribution forecast situation in which colors such as "blue", "yellow", and "red" are displayed in a state of being superimposed on a map in correspondence with the number of mobile bodies 6 for every mesh region with respect to the distribution forecast situation of the mobile bodies 6 in excursion from another facility Pi (i≠j) with the facility Pj set as a destination after a constant time (a plurality of times).

For example, in a state in which the number of the mobile bodies 6 is classified into three stages (a first setting value<a second setting value<a third setting value), in a case where the number of the mobile bodies 6 is less than the first setting value, "blue" may be employed, in a case where the number of the mobile bodies 6 is the first setting value or more and less than the second setting value, "yellow" may be employed, and in a case where the number of the mobile bodies 6 is equal to or greater than the third setting value, "red" may be employed. Note that, the stages are not limited to the three stages. Classification may be performed into n stages (n is an arbitrary nature number larger than 1). Hereinafter, an index classified into n stages is referred to as "distribution degree"). Note that, with respect to a threshold value for computing the distribution degree, a default value may be set in advance, and may be individually set for every facility Pj as necessary.

According to this, a manager or a clerk of the facility Pj can intuitively understand the distribution forecast situation of the mobile body 6 of which a destination is the facility Pj at a plurality of times including the current time (for example, 15 minutes, 30 minutes, 45 minutes, 60 minutes, and the like) in the near future in each area partitioned as a mesh region. According to this, the manager or the clerk of the facility Pj can visually understand the inter-facility excursion of the mobile body 6 in time series as if looking at a weather forecast map, and thus the manager or the clerk can forecast how many peoples will visit the facility Pj after a predetermined time with accuracy.

Modification Example of (Outputting for Every Mobile Body Type Information)

Note that, in a case of forecasting a distribution situation of the mobile body 6 in excursion from another facility Pi (i≠j) with an arbitrary facility Pj set as a destination after elapse of a predetermined time from the current time $t_0$ for every mobile body type information by the mobile body distribution situation forecast unit 104 on the basis of the inter-facility movement correlation information for every mobile body type information, the forecast situation output unit 105 can provide the distribution forecast situation of the mobile body 6 in excursion from the other facility Pi (i≠j) with the facility Pj set as a destination for every mobile body type information in time series for each of a plurality of times including the current time in the near future (for example, 15 minutes, 30 minutes, 45 minutes, 60 minutes, and the like).

<Onboard Navigation Device 2>

Figure 4:
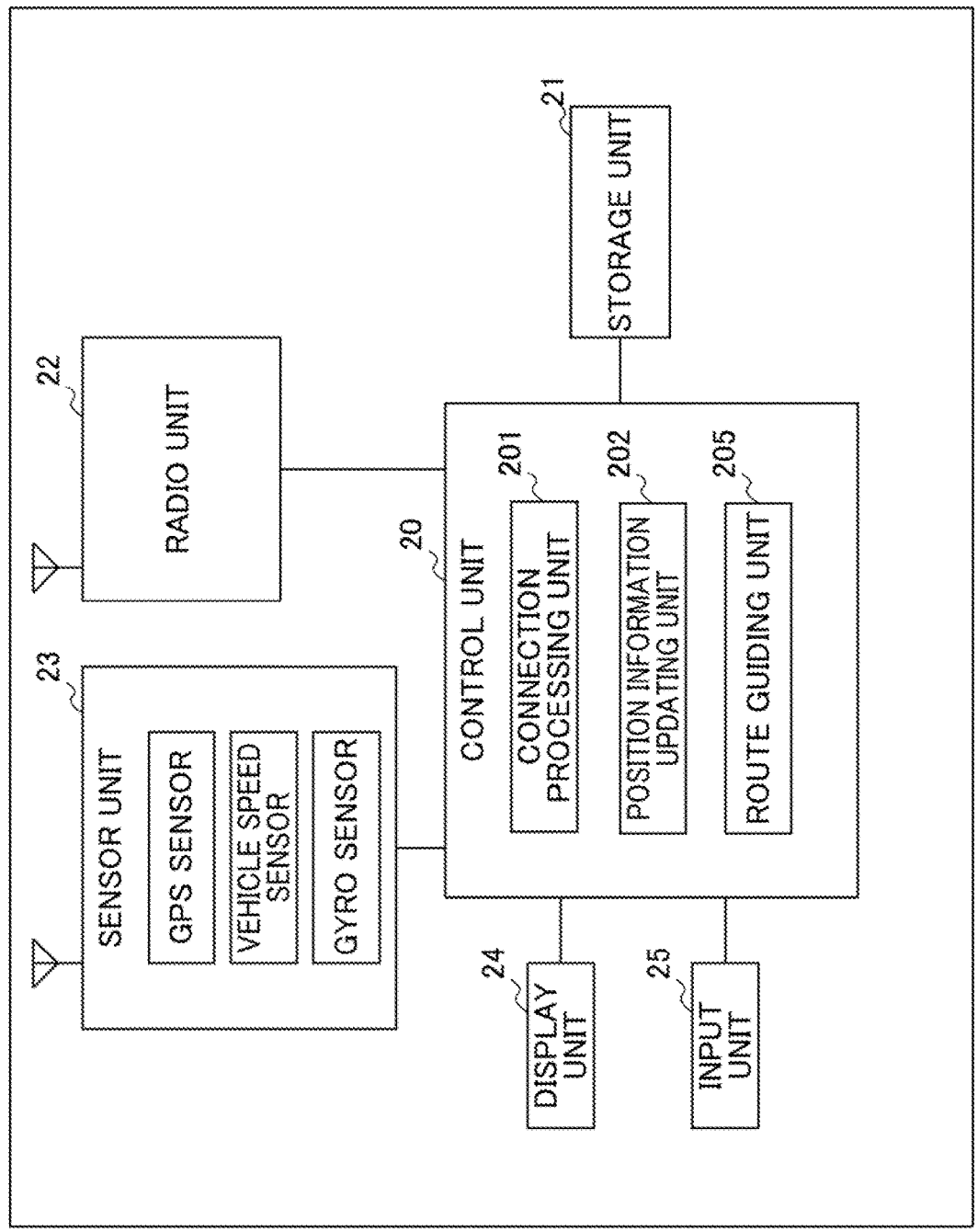
FIG. 4 is a view illustrating a configuration of an onboard navigation device 2 that is mounted on a vehicle.

Next, the onboard navigation device 2 will be described. FIG. 4 illustrates a configuration of the onboard navigation device 2. As illustrated in FIG. 4, the onboard navigation device 2 mounted on the vehicle 5 includes at least a control unit 20, a storage unit 21, a radio unit 22, a sensor unit 23, a display unit 24, and an input unit 25.

The control unit 20 is constituted by a microprocessor or the like, and performs control of respective constituent units. Details thereof will be described later.

The storage unit 21 is constituted by a semiconductor memory or the like, and stores an operating system (OS), programs for facility information display, route guidance, and the like, and various pieces of information such as map information and position information. Note that, the map information may be stored in advance in the storage unit 21, or may be acquired from the server system 1.

The radio unit 22 includes a digital signal processor (DSP) or the like, performs radio communication through a radio communication network represented by a mobile phone network such as 3G and LTE, and is configured to perform radio communication with the server system 1. The radio unit 22 can transmit an identification number for identifying the vehicle 5 (hereinafter, also referred to as "vehicle ID"), passwords, mobile body type information, current position information of the vehicle 5, current time information, and the like to the server system 1.

The sensor unit 23 is constituted by a GPS sensor, a vehicle speed sensor, a Gyro sensor, or the like provided in the vehicle 5. The sensor unit 23 has a function as a position detection unit that detects a current position, receives a GPS satellite signal by the GPS sensor, and measures the current position (attitude and longitude) of the vehicle 5. In addition, when including the vehicle speed sensor, the Gyro sensor, a geomagnetic sensor, and the like, it is possible to measure a current position of the vehicle 5 by autonomous navigation, and in a case where the GPS sensor cannot measure position from the GPS satellite signal, it is possible to measure the current position instead of the GPS sensor. In addition, in a case where GPS communication is not possible, it is also possible to compute the current position of the vehicle 5 by base station information acquired from the radio unit 22 by using assisted global positioning system (AGPS) communication.

The display unit 24 is constituted by a display device such as a liquid crystal display and an organic EL panel, and displays an image after receiving an instruction from the control unit 20. The display unit 24 can display various pieces of information such as a current position of the vehicle 5, map information nearby the current position of the vehicle 5 which is read out from the storage unit 21, a destination set by a user, and route information.

The input unit 25 is constituted by an input device (not illustrated) such as a physical switch called a ten key and a touch panel provided in a state of being superimposed on a display surface of the display unit 24. An operation such as map display, facility information display, and enlargement or reduction of a map can be performed by outputting a signal based on an operation input from the input unit 25, for example, pressing of the ten key or touching on the touch panel by a user to the control unit 20. Note that, although not illustrated in the drawings, a speaker 16 and a microphone 17 may be provided. The speaker 16 outputs a voice to a driver, and the microphone 17 collects a voice or the like uttered by the driver.

In this configuration, information can be output from the speaker 16 as a voice, and various selections or instructions by a driver (or a user) which are input as a voice through the microphone 17 can be input to the control unit 20 by a voice recognition technology.

The control unit 20 is constituted by a microprocessor including a CPU, a RAM, a ROM, an I/O, and the like. The CPU executes each program read out from the ROM or the storage unit 21, reads out information from the RAM, the ROM, and the storage unit 21 in execution of the program, writes the information in the RAM and the storage unit 21, and transmits and receives a signal to and from the radio unit 22, the sensor unit 23, the display unit 24, and the input unit 25.

The control unit 20 executes each program (hereinafter, also collectively referred to as "position information transmission control application") to cause the onboard navigation device 2 to function as a predetermined unit (hereinafter, also collectively referred to as "position information transmission control unit"). For example, when a program for position information transmission control is activated, position information is periodically transmitted to the server system 1.

In addition, the control unit 20 executes respective programs to cause the onboard navigation device 2 to execute a predetermined procedure (hereinafter, collectively referred to as "position information transmission control procedure").

Hereinafter, the function of the control unit 20 will be described from the viewpoints of the position information transmission control unit. Note that, description based on the viewpoints of a position information transmission control procedure (method) will be omitted because description can be made by substituting "unit" with "procedure".

As illustrated in FIG. 4, the control unit 20 includes a connection processing unit 201, a position information updating unit 202, and a route guiding unit 205.

<Automatic Activation>

The onboard navigation device 2 automatically activates when an ignition switch of the vehicle 5 is turned on (an engine is started) by a driver. The onboard navigation device 2 activates until the ignition switch of the vehicle 5 is turned off (the engine is stopped) by the driver.

<Connection Processing Unit 201>

When the onboard navigation device 2 automatically activates, the connection processing unit 201 executes log-in processing with respect to the server system 1 by using, for example, an identification number (vehicle ID) for identifying the vehicle 5 and passwords, and transmits the mobile body type information, the current position information of the vehicle 5 which is computed by the sensor unit 23, the current time information acquired from a time measuring unit (not illustrated), and the like to the server system 1.

<Position Information Updating Unit 202>

The position information updating unit 202 periodically transmits the vehicle ID, the current position information of the vehicle 5 which is computed by the sensor unit 23, the current time information acquired from the time measuring unit (not illustrated), and the like to the server system 1. Note that, an advancing direction of the vehicle 5 which is computed by the sensor unit 23 can be included as information to be transmitted.

The position information updating unit 202 transmits the current position information of the vehicle 5, the current time information, and the like which are acquired with a predetermined time interval (for example, every three seconds) to the server system 1 in real time. In addition, instead of transmitting the information to the server system 1 in real time, a plurality of pieces of information may be transmitted at a time (so-called burst transmission) by collecting the plurality of pieces of information (for example, by collecting the current position information of the vehicle 5 for five minutes, the current time information, and the like).

Note that, the acquisition time interval of the current position information and the like of the vehicle 5 (for example, every three seconds), or the number of pieces of information which are transmitted at a time in a case of collectively burst-transmitting a plurality of pieces of information, and the like may be set in advance.

<Route Guiding Unit 205>

The route guiding unit 205 executes route guidance on the basis of route information in which a predetermined facility is set as a destination and which is received from the server system 1 through the radio unit 22, or route information computed by the onboard navigation device 2 (for example, by the route guiding unit 205).

Note that, the position information updating unit 202 can transmit the vehicle ID, the current position information of the vehicle 5 which is computed by the sensor unit 23, the current time information acquired from the time measuring unit (not illustrated), and the like to the server system 1 until the ignition switch is turned off (engine stop) after determining that the vehicle 5 arrives at a destination such as a facility by the route guiding unit 205.

<Portable Terminal 3>

Figure 5:
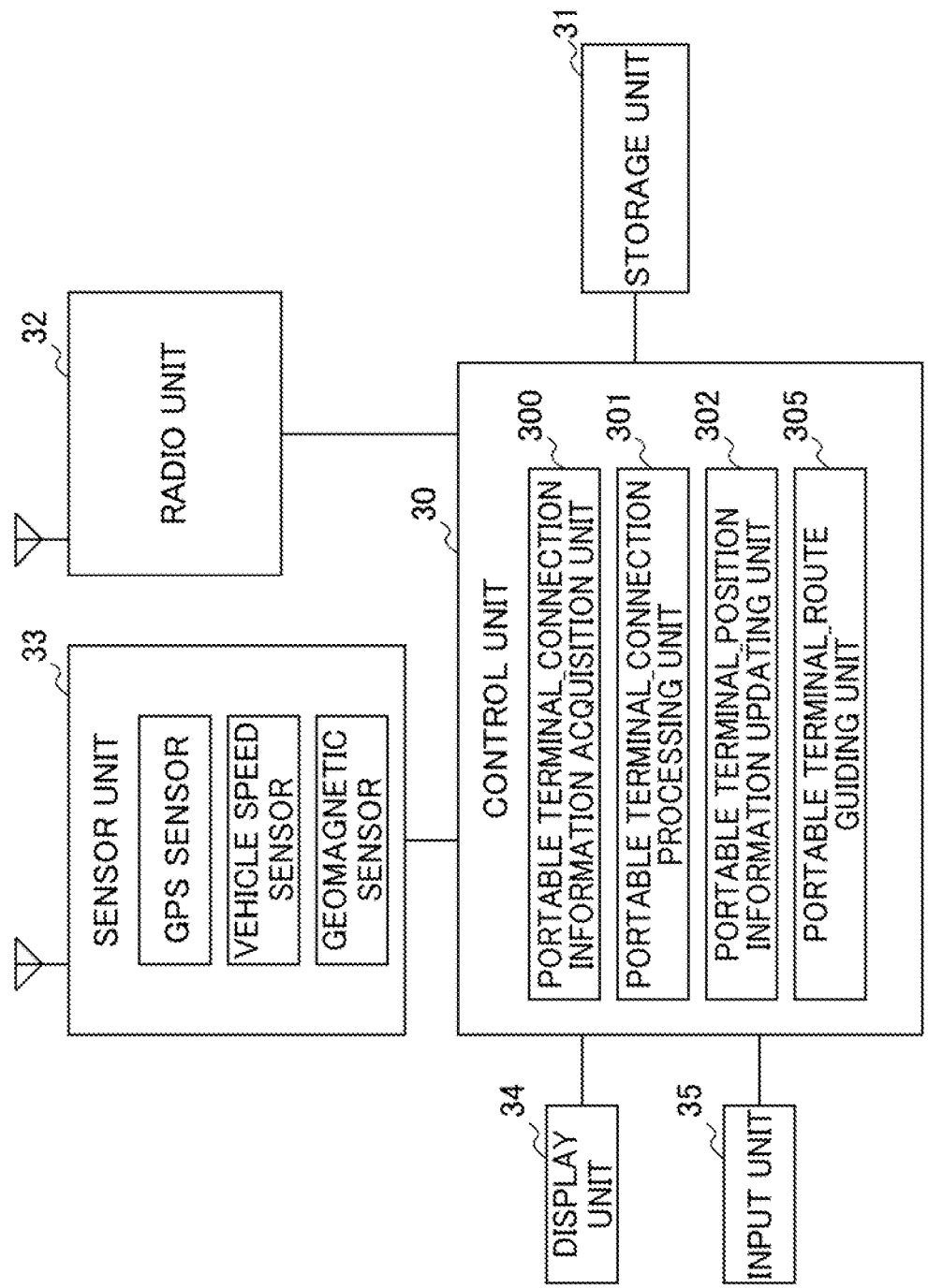
FIG. 5 is a view illustrating a configuration of a portable terminal 3.

Next, the portable terminal 3 will be described. FIG. 5 illustrates a configuration of the portable terminal 3. As illustrated in FIG. 5, the portable terminal 3 includes at least a control unit 30, a storage unit 31, a radio unit 32, a sensor unit 33, a display unit 34, and an input unit 35.

The control unit 30 is constituted by a microprocessor or the like, and performs control of respective constituent units. Details thereof will be described later.

The storage unit 31 is constituted by a semiconductor memory or the like, and stores an operating system (OS), programs for route guidance, and various pieces of information such as map information, road link information, and position information. Note that, the map information, the road link information, and the like may be stored in advance in the storage unit 31. In addition, the information may be appropriately acquired from the server system 1.

The radio unit 32 includes a digital signal processor (DSP) or the like, performs radio communication through a radio communication network represented by a mobile phone network such as 3G and LTE, and is configured to perform radio communication with the server system 1. The radio unit 32 can transmit current position information of the portable terminal 3, current time information, an ID for identifying a service subscription state (hereinafter, referred to as "user ID"), passwords, facility information set as a destination, and the like to the server system 1, and can receive facility information, electronic coupon information of a facility, route information, and the like from the server system 1.

The sensor unit 33 is constituted by a GPS sensor, a Gyro sensor, a geomagnetic sensor, or the like. The sensor unit 33 has a function as a position detection unit that detects a current position, receives a GPS satellite signal by the GPS sensor, and measures the current position (attitude and longitude) of the portable terminal 3. In addition, in a case where GPS communication is not possible, it is also possible to compute the current position of the vehicle 5 by base station information acquired from the radio unit 32 by using assisted global positioning system (AGPS) communication.

The display unit 34 is constituted by a display device such as a liquid crystal display and an organic EL panel, and displays an image after receiving an instruction from the control unit 30. The display unit 34 displays various pieces of information such as a current position of the portable terminal 3, map information nearby a current position of the portable terminal which is read out from the storage unit 31, a destination set by a user, and route information.

The input unit 35 is constituted by an input device (not illustrated) such as a physical switch called a ten key and a touch panel provided in a state of being superimposed on a display surface of the display unit 34. An operation such as map display, facility information display, and enlargement or reduction of a map can be performed by outputting a signal based on an operation input from the input unit 35, for example, pressing of the ten key or touching on the touch panel by a user to the control unit 30.

For example, the portable terminal 3 can include a short range communication unit 26 based on non-contact communication called near field communication (NFC) or a wire.

In addition, in a case where a vehicle includes the short range communication unit, and for example, an electronic control unit (ECU) of the vehicle 5 can perform communication with the portable terminal 3 through the short range communication unit 26, the portable terminal 3 can acquires mobile body type information or a state of the vehicle 5 (for example, an ignition-on state, a travelling state, an ignition-off state, and the like). Note that, in a case where the vehicle 5 includes the GPS sensor, the portable terminal 3 may acquire position information of the vehicle 5 which is measured by the GPS sensor of the vehicle 5.

More specifically, when a user gets on the vehicle 5 while carrying the portable terminal 3, and turns on an activation switch of the vehicle 5 such as an ignition switch, the vehicle 5 and the portable terminal 3 are paired, and position information measured by the vehicle 5 or the portable terminal 3 can be uploaded to the server system 1 from the portable terminal 3. In addition, when the activation switch is turned off, pairing between the vehicle 5 and the portable terminal 3 is released, and a position at the time of release may be uploaded to the server system 1 as a final vehicle position, that is, a parking position.

The control unit 30 is constituted by a microprocessor including a CPU, a RAM, a ROM, an I/O, and the like. The CPU executes each program read out from the ROM or the storage unit 31, reads out information from the RAM, the ROM, and the storage unit 31 in execution of the program, writes the information in the RAM and the storage unit 31, and transmits and receives a signal to and from the radio unit 32, the sensor unit 33, the display unit 34, and the input unit 35.

The control unit 30 executes each program (hereinafter, also collectively referred to as "portable terminal_position information transmission control application") to cause the portable terminal 3 to function as a predetermined unit (hereinafter, also collectively referred to as "portable terminal_position information transmission control unit"). Note that, the function of the portable terminal_position information transmission control application is basically the same as the function of the position information transmission control application of the onboard navigation device 2.

In addition, the control unit 30 executes respective programs to cause the portable terminal 3 to execute a predetermined procedure (hereinafter, collectively referred to as "portable terminal_position information transmission control procedure").

Hereinafter, the function of the control unit 30 will be described from the viewpoints of the portable terminal_position information transmission control unit. Note that, description based on the viewpoints of the portable terminal_position information transmission control procedure (method) will be omitted because description can be made by substituting "unit" with "procedure".

As illustrated in FIG. 5, the control unit 30 includes a portable terminal_connection information acquisition unit 300, a portable terminal_connection processing unit 301, a portable terminal_position information updating unit 302, and a portable terminal_route guiding unit 305.

When a user turns on an activation switch of the vehicle 5 such as an ignition switch, the vehicle 5 and the portable terminal 3 are paired, and the portable terminal_position information transmission control unit is activated. In addition, when the activation switch of the vehicle 5 such as the ignition switch is turned off, pairing between the vehicle 5 and the portable terminal 3 is released, and the portable terminal_position information transmission control unit stops the function.

<Portable Terminal_Connection Information Acquisition Unit 300>

The portable terminal_connection information acquisition unit 300 performs communication with the electronic control unit (ECU) of the vehicle 5 through the short range communication unit 26 to acquire the mobile body type information and a status of the vehicle 5 (for example, an ignition-on state, a travelling state, an ignition-off state, or the like). In addition, in a case where the vehicle 5 includes the GPS sensor, the portable terminal_connection information acquisition unit 300 may acquire the position information of the vehicle 5 which is measured by the GPS sensor of the vehicle 5.

The portable terminal_connection information acquisition unit 300 provides the mobile body type information or the state of the vehicle 5 (for example, the ignition-on state, the travelling state, the ignition-off state, and the like) which is acquired from the ECU of the vehicle 5 to the portable terminal_connection processing unit 301 and the portable terminal_position information updating unit 302 to be described later, and thus the portable terminal_connection processing unit 301 and the portable terminal_position information updating unit 302 can transmit the mobile body type information, the state of the vehicle 5, and the like to the server system 1.

<Portable Terminal_Connection Processing Unit 301>

When being paired with the vehicle 5, the portable terminal_connection processing unit 301 turns on the GPS sensor and the like, executes log-in processing by using an identification number (mobile body ID) for identifying the mobile body 6 and passwords, and transmits the mobile body type information acquired through the portable terminal_connection information acquisition unit 300, the current position information of the vehicle 5 which is computed by the sensor unit 13, the current time information acquired from the time measuring unit (not illustrated), and the like to the server system 1.

<Portable Terminal_Position Information Updating Unit 302>

The portable terminal_position information updating unit 302 has the same function as the function of the position information updating unit 202 of the onboard navigation device 2. Description of functions can be made by substituting the onboard navigation device 2 and the position information updating unit 202 with the portable terminal 3 and the portable terminal_position information updating unit 302. For example, as in the position information updating unit of the onboard navigation device 2, the portable terminal_position information updating unit 302 periodically transmits the mobile body ID, the current position information of the portable terminal 3 which is computed by the sensor unit 33, the current time information acquired from the time measuring unit (not illustrated), and the like to the server system 1. Note that, as the transmission information, an advancing direction of the portable terminal 3 which is computed by the sensor unit 33, the mobile body type information acquired from the ECU of the vehicle 5 by the portable terminal_connection information acquisition unit 300, a state of the vehicle 5, and the like may be included.

<Portable Terminal_Route Guiding Unit 305>

The portable terminal_route guiding unit 305 has the same function as the function of the route guiding unit 205 of the onboard navigation device 2. Description of functions can be made by substituting the onboard navigation device 2 and the route guiding unit 205 with the portable terminal 3 and the portable terminal_route guiding unit 305, and thus detailed description thereof will be omitted.

Note that, in a case of initiating route guidance by the portable terminal 3, even in a case where a user gets off the vehicle 5 or even in a case where the user walks or uses public traffic transportation, the route guidance can be continued.

In a case of not using the route guidance by the route guiding unit 205 of the portable terminal 3, the task of the portable terminal_route guiding unit 305 may be terminated.

<Distribution Situation Display Terminal 4>

Figure 6:
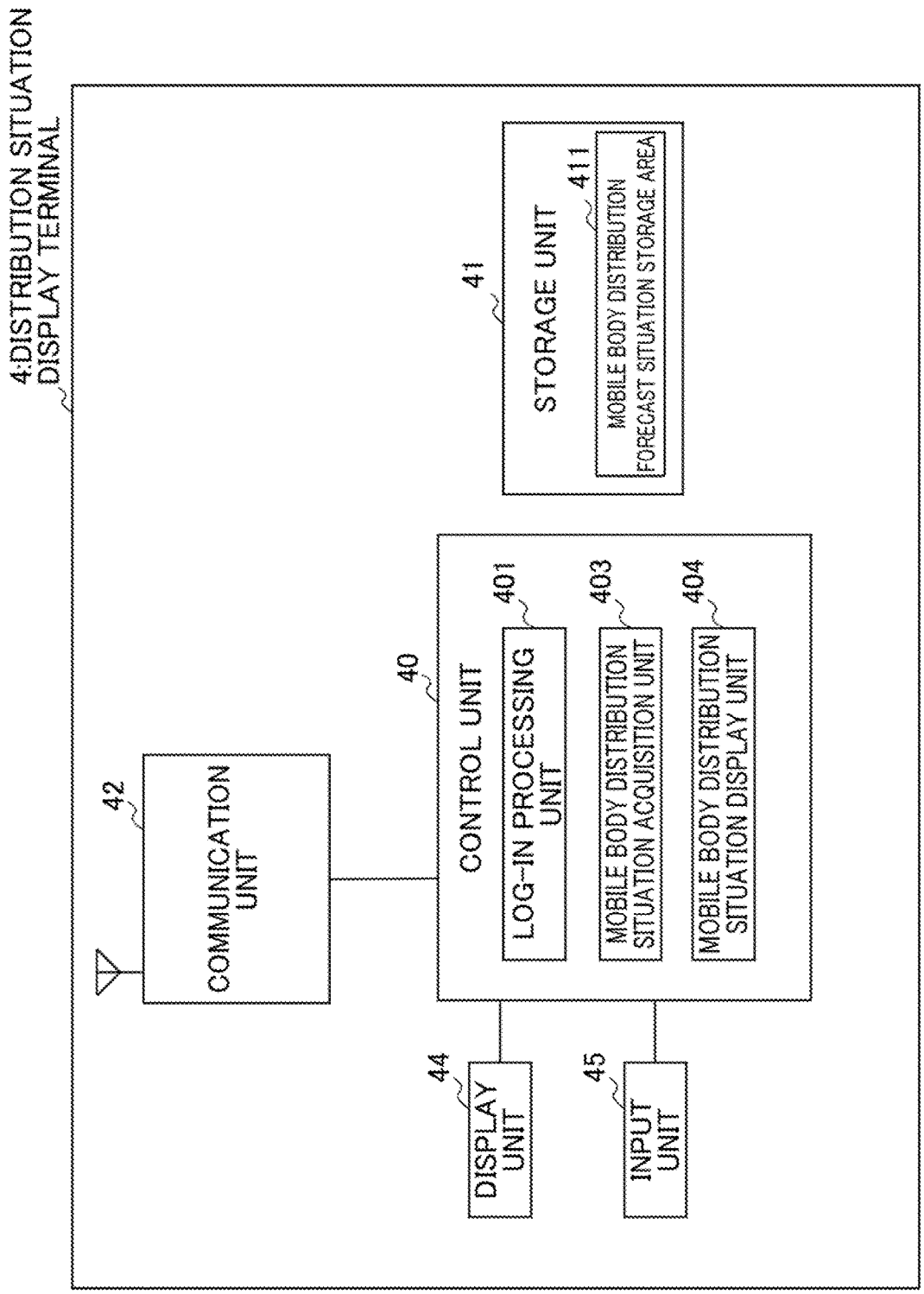
FIG. 6 is a view illustrating a configuration of a distribution situation display terminal 4.

Next, the distribution situation display terminal 4 will be schematically described. FIG. 6 illustrates a configuration of the distribution situation display terminal 4.

As illustrated in FIG. 6, the distribution situation display terminal 4 includes at least a control unit 40, a storage unit 41, a communication unit 42, a display unit 44, and an input unit 45. The configurations of the communication unit 42, the display unit 44, and the input unit 45 are similar to the configurations of respective units to which the portable terminal 3 and the server system 1 correspond. In addition, for example, the configuration of the storage unit 41 is similar to the configuration of the storage units of the portable terminal 3 and the server system 1 except that the storage unit 41 includes mobile body distribution forecast situation storage area 411.

The control unit 40 executes each program to cause the distribution situation display terminal 4 to function as a predetermined unit (hereinafter, collectively referred to as "mobile body distribution situation display control unit").

In addition, the control unit 40 executes each program for mobile body distribution situation display control to cause the distribution situation display terminal 4 execute a predetermined step (hereinafter, collectively referred to as "mobile body distribution situation display control step").

Hereinafter, the function of the control unit 40 will be described from the viewpoints of the mobile body distribution situation display control unit. Note that, description based on the viewpoints of the mobile body distribution situation display control step will be omitted because description can be made by substituting "unit" with "step".

As illustrated in FIG. 6, the control unit 40 includes a log-in processing unit 401, a mobile body distribution situation acquisition unit 403, and a mobile body distribution situation display unit 404. Note that, in the following description, a facility is represented by Pj.

<Log-In Processing Unit 401>

For example, the log-in processing unit 401 executes log-in processing with respect to the server system 1 by using identification number (facility ID) for identifying the facility Pj and passwords.

<Mobile Body Distribution Situation Acquisition Unit 403>

Figure 7:
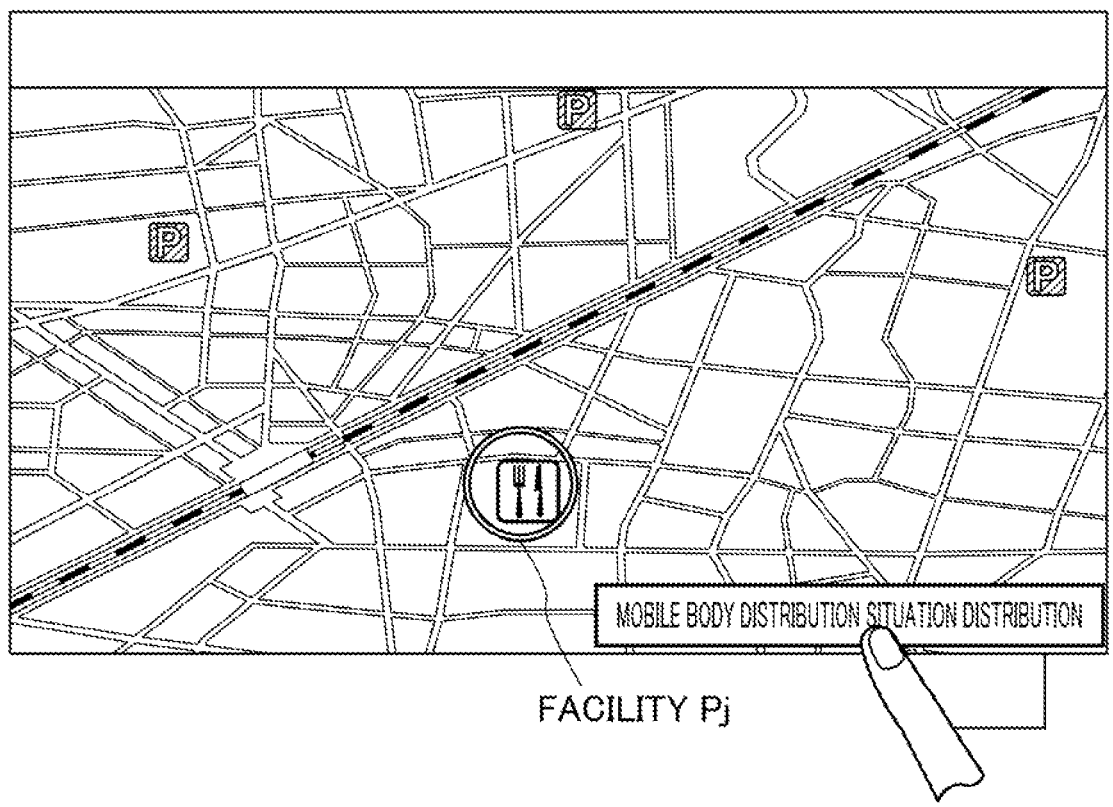
FIG. 7 is a view illustrating an example of a screen for making a request for distribution of mobile body distribution situation displayed on the distribution situation display terminal 4.

As illustrated in FIG. 7, the mobile body distribution situation acquisition unit 403 displays, for example, "mobile body distribution situation distribution" button on the display unit 44, and in a case where the mobile body distribution situation distribution is turned on through a touching operation on the button by a user, the mobile body distribution situation acquisition unit 403 transmits a mobile body distribution situation distribution request to the server system 1 through the communication unit 42. Note that, the mobile body distribution situation distribution may be turned on through the input unit 45. Hereinafter, in description of the mobile body distribution situation acquisition unit 403 and the mobile body distribution situation display unit 404, a current distribution forecast situation of the mobile body 6 and a distribution forecast situation of the mobile body 6 which is forecasted after elapse of a constant time in the near future that is set in advance a plurality of times represent a current distribution forecast situation of the mobile body 6 and a distribution forecast situation of the mobile body 6 forecasted after elapse of a constant time in the near future a plurality of times with a facility Pj set as a destination, respectively, unless otherwise stated.

The mobile body distribution situation acquisition unit 403 receives a current distribution forecast situation of the mobile body 6, and a distribution forecast situation of the mobile body 6 forecasted after elapse of a constant time in the near future that is set in advance a plurality of times (for example, 15 minutes, 30 minutes, 45 minutes, 60 minutes, and the like) from the server system 1 with a time interval (for example, an interval of 15 minutes) that is set in advance for every mesh region on a map which is set in advance. Note that, as the distribution forecast situation, for example, a distribution degree of the mobile body 6, which is obtained by dividing a distribution situation of the mobile body 6 by n stages (n is an arbitrary nature number greater than 1), can be received. For example, in a case where n is set to 3, Distribution Degree 1 represents a state in which the number of mobile bodies 6 with the facility Pj set as a destination is very small, Distribution Degree 2 represents a state in which the number of the mobile bodies 6 with the facility Pj set as a destination is average, and Distribution Degree 3 represents a state in which the number of the mobile bodies 6 with the facility Pj set as a destination is large.

Note that, with regard to the mesh region on a map, the mobile body distribution situation acquisition unit 403 can display a mesh region having a size that is $n^2$ times (n≥2) the size of the mesh region that is set in the server system 1.

In addition, with regard to after elapse of a constant time in the near future (a plurality of times), selection thereof may be made after elapse of a constant time (a plurality of times) that is set in the server system 1.

It is preferable that the mobile body distribution situation acquisition unit 403 acquires the current distribution forecast situation of the mobile body 6 and the distribution forecast situation of the mobile body 6 after elapse of a constant time (a plurality of times) in all mesh regions included in a sufficiently large local area including a position of the facility Pj at the current time from the server system 1 in a time-series order or at a time. More specifically, for example, with regard to at least the current distribution forecast situation of the mobile body 6 and the distribution forecast situation of the mobile body 6 after elapse of a constant time (a plurality of times) in mesh regions included in a map displayed on the display unit 44, it is preferable to acquire the distribution forecast situations in a time-series order or at a time. Note that, during display of the current distribution forecast situation of the mobile body 6 and the distribution forecast situation of the mobile body 6 after elapse of a constant time (a plurality of times) on the display unit 44, the mobile body distribution situation acquisition unit 403 may acquire the current distribution forecast situation of the mobile body 6 and the distribution forecast situation of the mobile body 6 after elapse of a constant time (a plurality of times) in mesh regions included in another local area that is not displayed on the display unit 44 from the server system 1 in combination at the background.

According to this, the mobile body distribution situation acquisition unit 403 can receive the current distribution forecast situation of the mobile body 6 and the distribution forecast situation of the mobile body 6 after elapse of a constant time (a plurality of times) in each mesh region included in a sufficiently large local area centering around a mesh region including a current position of a host vehicle at the current time through the communication unit 42, and can store the distribution forecast situations in the mobile body distribution forecast situation storage area 411 of the storage unit 41, for example, in a time-series order.

Modification Example (Acquisition for Every Mobile Body Type Information)

In a case where the server system 1 (forecast situation output unit 105) can provide a distribution forecast situation of a mobile body 6 in excursion from another facility Pi (i≠j) with a facility Pj set as a destination in time series for each of a plurality of times including the current time (for example, 15 minutes, 30 minutes, 45 minutes, 60 minutes, and the like) in the near future for every mobile type information, the mobile body distribution situation acquisition unit 403 may acquire the current distribution forecast situation of the mobile body 6 and the distribution forecast situation of the mobile body 6 after elapse of a constant time (a plurality of times) from the server system 1 in a time-series order or at a time for every mobile body type information.

<Mobile Body Distribution Situation Display Unit 404>

The mobile body distribution situation display unit 404 displays the current distribution forecast situation of the mobile body 6 and the distribution forecast situation of the mobile body 6 after elapse of a constant time (a plurality of times), which are acquired by the mobile body distribution situation acquisition unit 403, on the display unit 44 in time series. Here, the distribution degree of the mobile body 6 is displayed in different colors.

Figure 8:
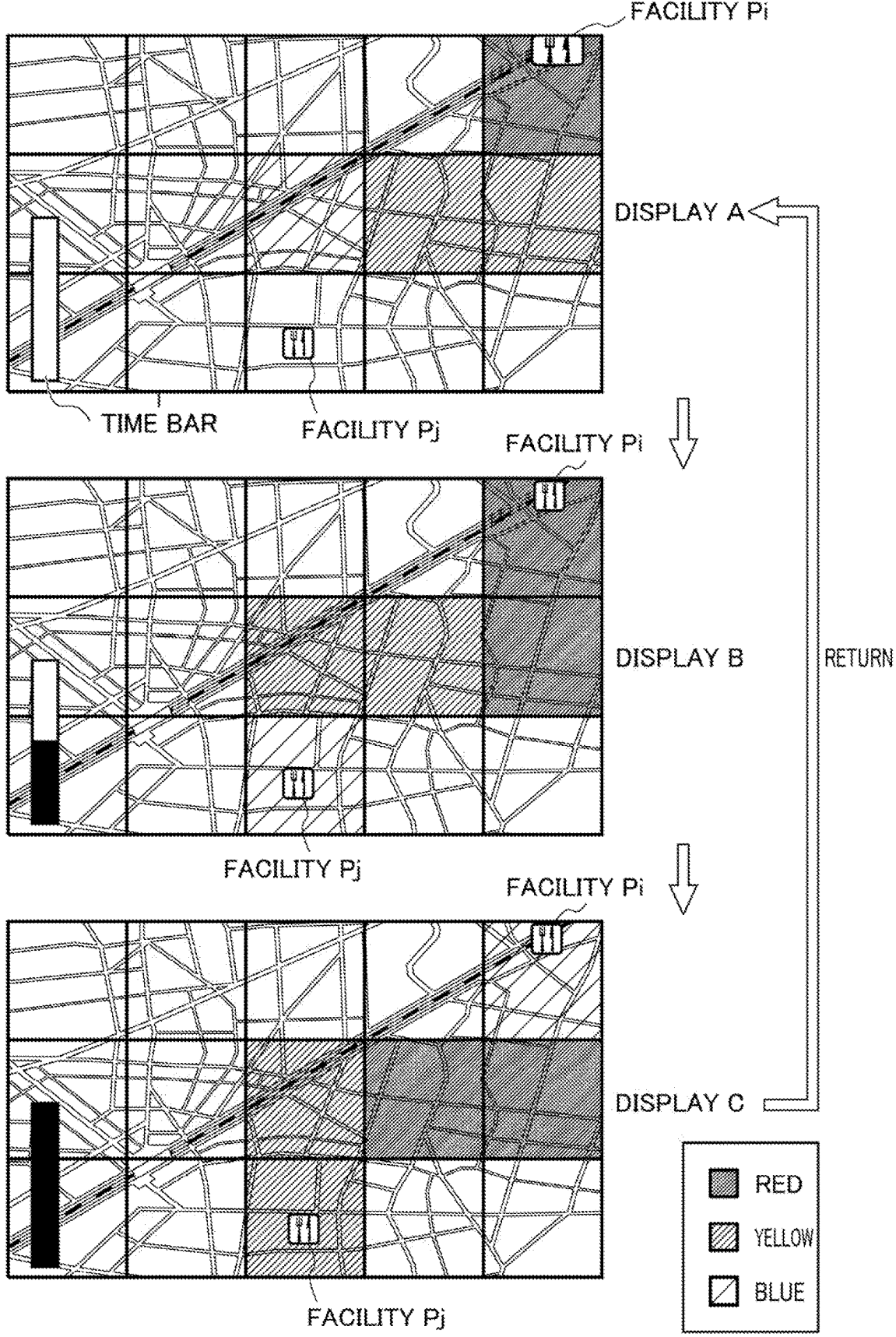
FIG. 8 is a view illustrating an example of a screen that displays a current distribution forecast situation of a mobile body 6 in each mesh region, and a distribution forecast situation of the mobile body 6 after elapse of a constant time (a plurality of times) on the distribution situation display terminal 4 in time series.
Figure 9:
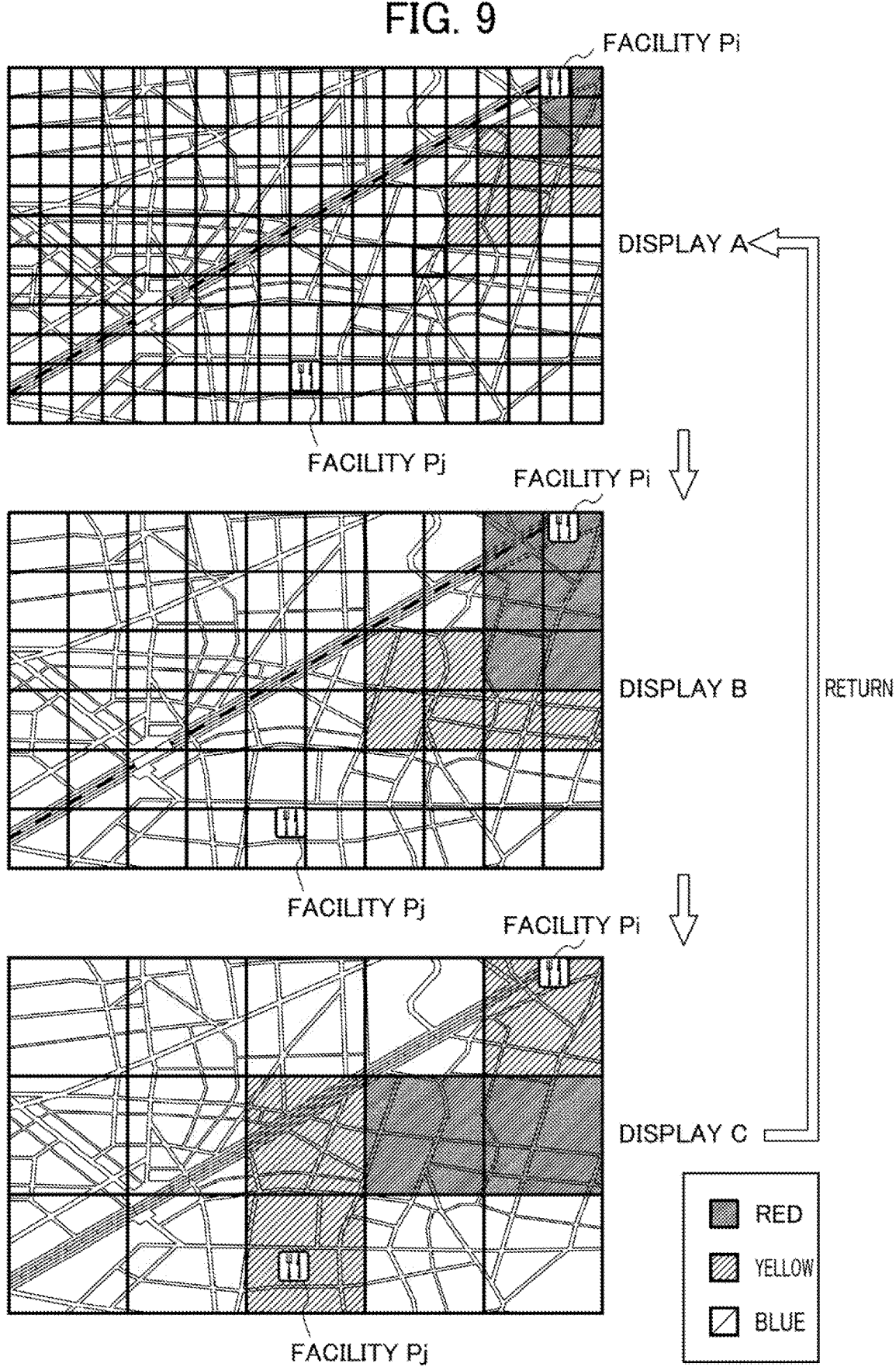
FIG. 9 is a view illustrating an example of a screen that displays a current distribution forecast situation of a mobile body 6 in each mesh region, and a distribution forecast situation of the mobile body 6 after elapse of a constant time (a plurality of times) on the distribution situation display terminal 4 in time series.

FIG. 8 and FIG. 9 illustrate an example of a screen in which the current distribution forecast situation of the mobile body 6 and the distribution forecast situation of the mobile body 6 after elapse of a constant time (a plurality of times) are displayed on the display unit 44. Note that, in a case where a constant time is set as T, in FIG. 8 and FIG. 9, two kinds of near future which include distribution forecast (Display B) of the mobile body 6 in the near future after elapse of time T from the current time, and distribution forecast (Display C) of the mobile body 6 in the near future after elapse of time 2T from the current time are exemplified. However, as to be described later, in a case where the server system 1 (mobile body distribution situation forecast unit 104) performs forecast with respect to N (N≥1) kinds of near futures, the mobile body distribution situation display unit 404 displays distribution forecast situations of the mobile body 6 in the N kinds of near future in a time-series order.

Note that, in FIG. 8 and FIG. 9, a departure facility Pi (i≠j) is displayed in combination, and an example of an inter-facility movement route and a distribution situation of the mobile body 6 that moves from the facility Pi toward the facility Pj is displayed.

As described above, in a case where the distribution degree of the mobile body 6 is classified into three stages, with respect to the current distribution forecast situation of the mobile body 6 and the distribution forecast situation of the mobile body 6 after elapse of a constant time (a plurality of times), the mobile body distribution situation display unit 404 displays colors corresponding to distribution degrees on respective mesh regions on a map in a state of being superimposed on the mesh regions so that "blue" is displayed in a case of Distribution Degree 1, "yellow" is displayed in a case of Distribution Degree 2, and "red" is displayed in a case of Distribution Degree 3 for every mesh region for easy intuitive discrimination.

Referring to FIG. 8, the mobile body distribution situation display unit 404 mesh-displays a current distribution forecast situation of the mobile body 6 on the display unit 44 for the first time (Display A). After Display A, the mobile body distribution situation display unit 404 sequentially performs display so that Display B representing a distribution forecast situation of the mobile body 6 is displayed after a constant time (hours or minutes) and Display C representing a distribution forecast situation of the mobile body 6 after a further constant time (hours or minutes) is displayed after Display B, and returns to Display A representing the current distribution forecast situation of the mobile body 6. This display operation is repeated.

In addition, for screen movement, for example, the mobile body distribution situation display unit 404 may display a "movement to a previous screen" button or a "movement stop" button to allow a user to move a currently displayed screen to a previous screen or a subsequent screen, or to continuously display the currently displayed screen through a touch operation of the buttons.

Referring to FIG. 8, it can be understood at a glance that the mobile body 6 is moving from the facility Pi to the facility Pj. In this manner, the user can intuitively understand an overview of the distribution forecast situation of the mobile body 6 in respective areas partitioned by a mesh.

According to this, a manager or a clerk of the facility Pj can intuitively understand a distribution forecast situation of the mobile body 6 with the facility Pj set as a destination in respective areas partitioned as mesh regions (that is, the number of visiting mobile bodies 6), and it is possible to determine whether or not to make a special preparation.

Note that, with regard to various inputs by the user, the user may be allowed to input a voice through the microphone 17 so that the voice is input to the mobile body distribution situation display unit 404 after being converted into codes by voice recognition technology.

<Time Bar>

Note that, as illustrated in FIG. 8, the mobile body distribution situation display unit 404 may form a time bar at a part of a screen. Due to the time bar, the user can easily understand whether a display screen relating to the distribution forecast situation of the mobile body 6 is a current display screen, or a forecast screen after a certain extent from the current time.

Modification Example of Time Bar

It is possible to employ a configuration in which the mobile body distribution situation acquisition unit 403 acquires forecast information that is forecasted in a predetermined size of mesh region with respect to the current distribution forecast situation of the mobile body 6, and acquires a distribution forecast situation of the mobile body 6 which is forecasted in a mesh region larger than the size of an immediately before mesh region as congestion forecast information relates to a time farther from the current time, that is, as a forecast time is a time farther from the current time, the size of the mesh region at the forecast time is further enlarged.

FIG. 9 illustrates a display example of the distribution forecast situation of the mobile body 6 by the mobile body distribution situation display unit 404. As illustrated in FIG. 9, the mobile body distribution situation display unit 404 displays the current distribution forecast situation of the mobile body 6 with a mesh having a predetermined size, and the size of the mesh is further enlarged as the distribution forecast situation of the mobile body 6 relates to a time farther from the current time. More specifically, display is performed in such a manner that a mesh size in Display B is larger than a mesh size in Display A, and a mesh size in Display C is larger than the mesh size in Display B.

According to this, it is expected that a hitting ratio of forecasting of the distribution situation of the mobile body 6 will decrease as time is farther, and thus the mobile body distribution situation display unit 404 further enlarges the size of the mesh region as a forecast time of the distribution situation of the mobile body 6 is farther. According to this, it is possible to realize display in which the magnitude of an error is intuitively permitted. In addition, it becomes easy for the user to understand that forecasting relates to a distribution situation of the mobile body 6 at how far time in accordance with the mesh size. As described above, there is an effect that intuitive recognition by the user becomes easier in comparison to the time bar illustrated in FIG. 8.

Modification Example (Display for Every Mobile Body Type Information)

In a case where the mobile body distribution situation acquisition unit 403 can acquire the current distribution forecast situation of the mobile body 6 and the distribution forecast situation of the mobile body 6 after elapse of a constant time (a plurality of times) from the server system 1 in a time-series order or at a time for every mobile body type information, the mobile body distribution situation display unit 404 may display the current distribution forecast situation of the mobile body 6 and the distribution forecast situation of the mobile body 6 after elapse of a constant time (a plurality of times) on the display unit 44 in time series for every mobile body type information.

(Operation of Mobile Body Distribution Situation Forecast System 100)

Figure 10:
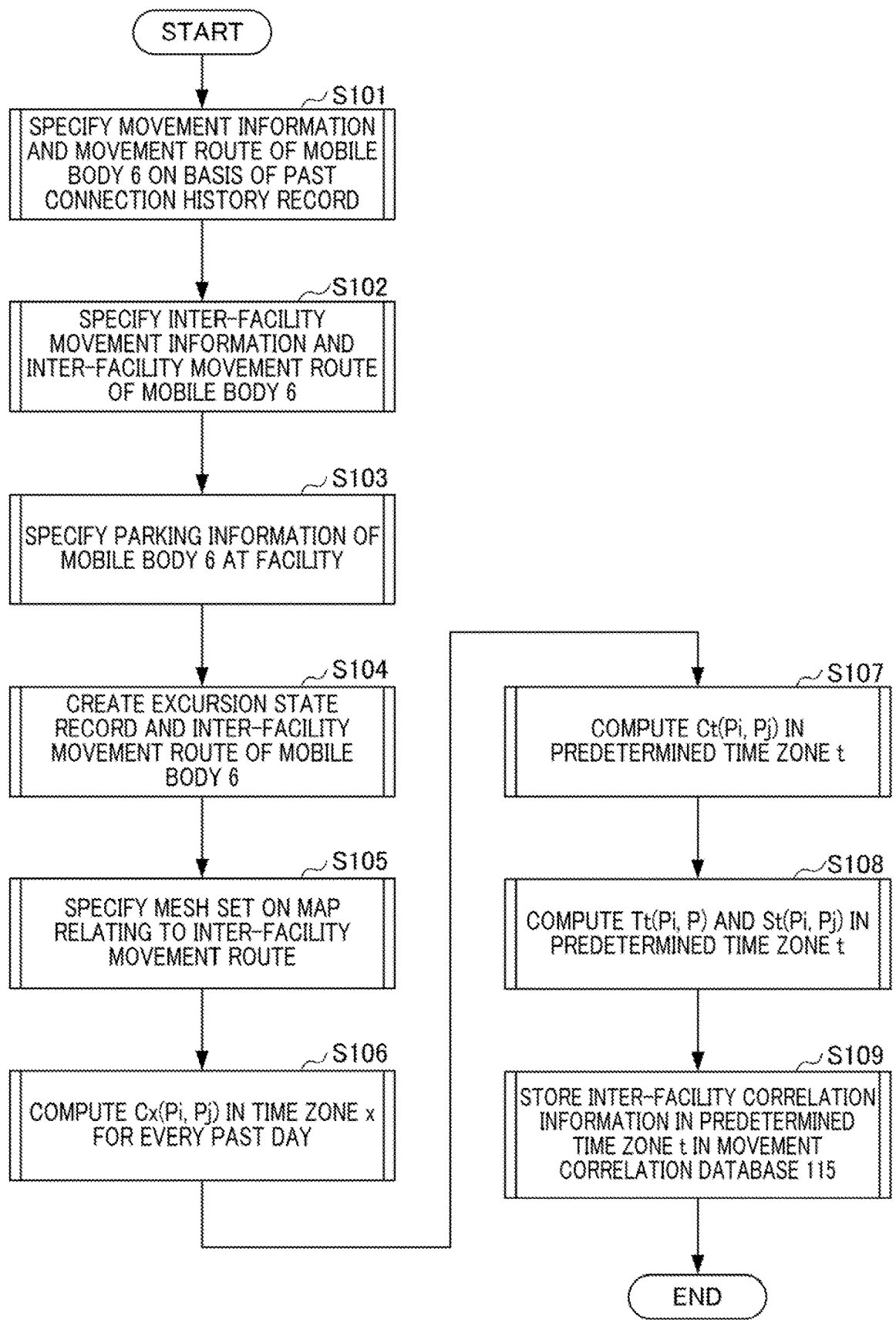
FIG. 10 is a flowchart illustrating a flow of processing by the server system 1.

Hereinbefore, the configuration of the mobile body distribution situation forecast system 100 has been described. Next, an operation of the server system 1 will be described. FIG. 10 and FIG. 11 are flowcharts illustrating an example of a processing flow in the server system 1.

First, description will be given of a flow of movement correlation information computation processing of the server system 1 with reference to FIG. 10.

In step S101, the server system 1 (the mobile body movement information specifying unit 102) sequentially performs processing on the basis of the past connection history record (within a predetermined period) stored in the connection history information area 114 in accordance with time information for every mobile body ID to specify all pieces of movement information (a departure site, departure date and time, an arrival site, and arrival date and time) and an inter-facility movement route from a departure place to an arrival place of the mobile body 6.

In step S102, the server system 1 (the mobile body movement information specifying unit 102) specifies inter-facility movement information (a departure facility ID, departure date and time, an arrival facility ID, and arrival date and time) relating to facility parking lots of analysis target facility excluding sites other than an analysis target area, a private parking lot such as a home and a monthly parking lot, and a parking lot other than the analysis target facility, and an inter-facility movement route (excursion route) R(Pi→Pj) from the departure facility ID (Pi) to the arrival facility ID (Pj) for every mobile body ID on the basis of the movement information and the inter-facility movement route for every mobile body ID which are specified in step S101.

In step S103, the server system 1 (the mobile body movement information specifying unit 102) calculates a parking time at the analysis target facility from a difference between the arrival time and the departure time on the basis of the inter-facility movement information specified in step S102, and specifies parking information (a facility ID, arrival date and time, a parking time, and departure date and time) of the mobile body 6 at the facility parking lot of the analysis target facility for every mobile body ID.

In step S104, the server system 1 (the mobile body movement information specifying unit 102 creates an inter-analysis-target-facility excursion state record and an inter-facility movement route on the same day by sorting the parking information (the facility ID, the arrival date and time, the parking time, and the departure date and time) of the mobile body 6 at the facility parking lot of the analysis target facility for every mobile body ID, for example, in the order of arrival date and time, and stores the excursion state record and the inter-facility movement route in the movement information database 1151.

In step S105, the server system 1 (the mobile body movement information specifying unit 102) specifies a mesh set on a map relating to the inter-facility movement route (excursion route) R(Pi→Pj) on the basis of the inter-facility movement route R(Pi→Pj) stored in the movement information database 1151, and stores the mesh set in the movement information database 1151.

Note that, the server system 1 (the mobile body movement information specifying unit 102) checks whether or not a plurality of the mesh sets on a map relating to the inter-facility movement route R(Pi→Pj) exist, and in a case where the plurality of mesh sets exist, an identification ID is assigned for every mesh set on a map relating to the inter-facility movement route R(Pi→Pj).

In step S106, the server system 1 (the inter-facility movement computation unit 103) computes the number of mobile bodies Nx(Pi) which departed from the facility Pi, the number of mobile bodies Nx(Pi→Pj) in which the facility Pj is set as the subsequent destination (arrival place) among the mobile bodies departed from the facility Pi in a time zone x, and a ratio of a mobile body Cx(Pi, Pj) in which the facility Pj is set as a destination among mobile bodies departed from the facility Pi for every time zone (represented by a variable x) of an arbitrary date included in the past (within a predetermined period) on the basis of the inter-analysis-target-facility excursion state record of all mobile bodies 6 which is stored in the movement information database 1151.

In step S107, the server system 1 (the inter-facility movement computation unit 103 computes an average value of Cx(Pi, Pj) corresponding to an arbitrary combination of time zone (represented by a variable t) such as a season, a month, a day of the week, a weekday/holiday, and a time zone which are included in the past (within in a predetermined period) to compute a certainty factor Ct (Pi, Pj) in which the facility Pi is set as a departure place and the facility Pj is set as a destination (arrival place) in a time zone t. According to this, the server system 1 (the inter-facility movement computation unit 103) can acquire the certainty factor Ct (Pi, Pj) in which the facility Pi is set as a departure place, and the facility Pj is set as a destination (arrival place), for example, in a holiday daytime zone t.

In step S108, the server system 1 (the inter-facility movement computation unit 103 computes an inter-facility movement average time (estimated inter-facility movement time) Tt(Pi→Pj) until the mobile body 6 arrives at the facility Pj after departing from the facility Pi in a time zone t in the past (within a predetermined period) and an average staying time (estimated facility staying time) St(Pi) of the mobile body 6 at the facility Pi on the basis of the inter-analysis-target-facility excursion state record and the inter-facility movement route of the mobile body 6 which is stored in the movement information database 1151. Note that, a plurality of mesh sets on a map relating to the inter-facility movement route R(Pi→Pj) exist, it is preferable that the inter-facility movement average time (estimated inter-facility movement time) is computed for every mesh set.

In step S109, the server system 1 (the inter-facility movement computation unit 103) stores the calculated inter-facility movement correlation information on an arbitrary combination of time zone t such as a season, a month, a day of the week, a weekday/holiday, and a time zone which are included in the past (within a predetermined period) in the movement correlation database 1152.

Next, description will be given of a flow of forecasting processing of distribution situation of the mobile body 6 at the current time and after elapse of a constant time (a plurality of times) by the server system 1 with reference to FIG. 11.

In the processing according to FIG. 11, it is assumed that the server system 1 stores a connection history record in the connection history information area 114 on the basis of position information that is periodically acquired from the mobile body 6, the distribution situation display terminal 4 has completed log-in processing with respect to the server system 1, and the distribution situation display terminal 4 has transmitted a mobile body distribution situation distribution request to the server system 1.

In addition, in the following description, for simplification, it is assumed that a distribution situation of the mobile body 6 that visits the facility Pj is forecasted.

In step S201, the server system 1 (the mobile body distribution situation forecast unit 104) computes a parking situation of the mobile body 6 with a predetermined time interval, and stores the parking situation in the mobile body departure/arrival table 1153 for every mobile body ID.

In step S202, the server system 1 (the mobile body distribution situation forecast unit 104) forecast the number of mobile bodies 6 ($Nt_n$(Pi→Pj)) which are forecasted to be in excursion toward the facility Pj as a destination after departing from the facility Pi in respective time zones $t_{-n}$, $t_{-n+1}$, ..., $t_{-1}$, $t_0$, $t_1$, $t_2$, ... before and after the current time $t_0$ on the basis of the mobile body departure/arrival table 1153 and the inter-facility movement correlation information.

In step S203, the server system 1 (the mobile body distribution situation forecast unit 104) forecasts that the mobile body 6 that departed or is scheduled to depart from the facility Pi (i≠j) will be located in which mesh region on the inter-facility movement route R(Pi→Pj) from the facility Pi to the facility Pj after elapse of a predetermined time from the current time $t_0$ for every predetermined time zone $t_n$, and stores the forecast result as mobile body distribution forecast data relating to the departure facility Pi in accordance with inter-facility movement from the facility Pi to the facility Pj. The processing is performed with respect to all facilities Pi (i≠j).

In step S204, the server system 1 (the mobile body distribution situation forecast unit 104) adds the mobile body distribution forecast data relating to the departure facility Pi in which a destination is the facility Pj after departing from the facility Pi for every mesh region with respect to all facilities Pi (i≠j) to forecast that mobile bodies 6 in excursion toward the facility Pj as a destination from the all facilities Pi (i≠j) will be located in any mesh region after elapse of a predetermined time from the current time $t_0$, that is, a distribution situation thereof, and stores the distribution situation as mobile body distribution forecast data.

In step S205, the server system 1 (the mobile body distribution situation forecast unit 104) performs the above-described processing (from step S203 to step S204) at a plurality of times including the current time (for example, 0 minute, 15 minutes, 30 minutes, 45 minutes, 60 minutes, and the like) in the near future, creates mobile body distribution forecast data with the facility Pj set as a destination for each of a plurality of elapsed times, and stores the data in time series.

In step S206, the server system 1 (the forecast situation output unit 105) provides (transmits) the distribution forecast situation of the mobile body 6 in excursion from another facility Pi (i≠j) with a facility Pj set as a destination to the distribution situation display terminal 4 in time series for each of a plurality of times including the current time (for example, 15 minutes, 30 minutes, 45 minutes, 60 minutes, and the like) in the near future.

In step S301, the distribution situation display terminal 4 (the mobile body distribution situation acquisition unit 403) receives a current distribution forecast situation and a distribution forecast situation of the mobile body 6, which is in excursion from another facility Pi (i≠j) with a facility Pj set as a destination, after elapse of a constant time (a plurality of times), and stores the distribution forecast situations in the mobile body distribution forecast situation storage area 411, for example, in time series.

In step S302, the distribution situation display terminal 4 (the mobile body distribution situation display unit 404) displays the current distribution forecast situation and the distribution forecast situation of the mobile body 6 in excursion from another facility Pi (i≠j) with a facility Pj set as a destination after elapse of a predetermined time (a plurality of times) on the display unit 44 in time series.

Hereinbefore, an embodiment has been described with respect to the mobile body distribution situation forecast system 100. However, the invention is not limited to the embodiment.

Modification Example 1

As described above, in the mobile body distribution situation forecast system 100, the server system 1 (the inter-facility movement computation unit 103) may compute the inter-facility movement correlation information for every mobile body type information of the mobile body 6, and the server system 1 (the mobile body distribution situation forecast unit 104) may forecast a distribution situation of the mobile body 6 after a predetermined time for every mobile body type information.

In addition, the distribution situation display terminal 4 (the mobile body distribution situation display unit 404) may display a current distribution forecast situation of the mobile body 6 and a distribution forecast situation of the mobile body 6 after elapse of a constant time (a plurality of times) in all mesh regions included in a nearby area including a position of the facility Pj on the display unit 44 in time series for every mobile body type information.

According to this, since a different excursion behavior is taken depending on the type of the mobile body, for example, between a case where the mobile body is a Wagon vehicle and a case where the vehicle is a sports car, when forecasting the mobile body distribution situation after a predetermined time for every type of the mobile body, it is possible to further improve forecasting accuracy.

Modification Example 2

In this embodiment, the mobile body 6 that is set as a movement distribution forecast target is limited to a mobile body 6 (hereinafter, referred to as "excursion mobile body 6") that is in excursion between facilities in which a departure site and a destination (arrival site) are set as analysis target facilities Pi and Pj. Accordingly, for example, with regard to distribution forecasting of a mobile body 6 (hereinafter, referred to as "first mobile body 6") that arrives at the facility Pj as a first destination from a home or the outside of an analysis target area, description thereof is omitted, but the distribution forecasting of the "first mobile body 6" to the facility Pj may be performed. According to this, for example, forecasting can be performed by including the "first mobile body 6" in a visitor to the facility Pj in combination with the distribution forecasting of the "excursion mobile body 6" forecasted by the server system 1 of this embodiment.

The distribution forecasting of the "first mobile body 6" to the facility Pj can be performed independently from the distribution forecasting of the "excursion mobile body 6".

Specifically, first, the mobile body movement information specifying unit 102 extracts movement information in which the first arrival site on the day becomes the facility Pj from a connection history record, which is stored in the connection history information area 114, in the past (within a predetermined period) on the basis of movement information (a departure site, departure date and time, and arrival date and time) of a specified mobile body 6. According to this, the mobile body movement information specifying unit 102 specifies the "first mobile body 6" arrived at the facility Pj in an arbitrary time zone x in the past (within a predetermined period), and an inter-facility movement route of the mobile body 6 up to the facility Pj (at least in an analysis target area).

Next, the mobile body movement information specifying unit 102 specifies the average number of "first mobile bodies 6" arrived at the facility Pj in an arbitrary combination of time zone (represented by a variable t) such as a season, a month, a day of the week, a weekday/holiday, and a time zone which are included in the past (within a predetermined period), and an inter-facility movement route pattern (an inter-facility movement route and an average movement speed) up to the facility Pj of the "first mobile bodies 6". According to this, the mobile body movement information specifying unit 102 can specify, for example, the average number of the "first mobile bodies 6" which arrive at the facility Pj in each time zone of a holiday, and an inter-facility movement route pattern up to the facility Pj.

According to this, the mobile body movement information specifying unit 102 can store information indicating that the "first mobile bodies 6", which will arrive at the facility Pj in the time zone t, will be located in which mesh regions in a plurality of times before the time zone t, for example, in the facility movement correlation information area 115 in advance as distribution forecast data relating to the "first mobile bodies 6".

According to the above-described mobile body distribution situation forecast system 100, the following effects are exhibited.

(1) The mobile body distribution situation forecast system 100 includes: an inter-facility movement computation unit 103 that computes an estimated facility staying time, an estimated inter-facility movement time, and an inter-facility movement correlation on the basis of a trend of past position information from a mobile body 6, a plurality of pieces of facility information, and map information including a road map; a reception unit 101 that receives current position information of a plurality of the mobile bodies 6; and a mobile body distribution situation forecast unit 104 that forecasts a distribution situation of the mobile body 6 after a predetermined time on the basis of the inter-facility movement correlation and the current position information of the plurality of mobile bodies 6.

According to this, for example, in facilities such as a restaurant and a museum, a manager or a clerk can forecast the number of customers (mobile bodies) who visit after a predetermined time with accuracy, and thus a preparation can be made in advance.

(2) The mobile body distribution situation forecast system 100 includes a forecast situation output unit 105 that expresses the forecasted distribution situation of the mobile body 6 after a predetermined time in a mesh shape and outputs the distribution situation in a state of being superimposed on the road map.

According to this, the manager or the clerk can visually understand the inter-facility excursion of a vehicle as if looking at a weather forecast map, and thus the manager or the clerk can forecast how many peoples will visit a facility after a predetermined time in time series.

(3) In the mobile body distribution situation forecast system 100, the inter-facility movement computation unit 103 further computes the estimated facility staying time, the estimated inter-facility movement time, and the inter-facility movement correlation for every type of the mobile body 6, and the mobile body distribution situation forecast unit 104 further forecasts a distribution situation of the mobile body 6 after a predetermined time for every type of the mobile body.

According to this, since a different excursion behavior is taken depending on the type of the mobile body, for example, between a case where the mobile body is a Wagon vehicle and a case where the vehicle is a sports car, when forecasting the distribution situation of the mobile body 6 after elapse of a predetermined time for every type of the mobile body 6, it is possible to further improve forecasting accuracy such as how many peoples will visit a facility after a predetermined time.

The mobile body distribution situation forecast system 100 of the invention can be executed by hardware or can be executed by software.

In other words, functional configurations in FIG. 2, FIG. 4, FIG. 5, and FIG. 6 are illustrative only, and are not particularly limited. That is, it is sufficient if a function capable of executing a series of processing relating to the distribution situation of the mobile body 6 and the display function according to the invention is provided in the mobile body distribution situation forecast system 100, and use of any functional block for realization of the function is not particularly limited to the examples in FIG. 2, FIG. 4, FIG. 5, and FIG. 6.

In addition, one functional block may be constituted by a hardware element, a software element, or in combination of the elements.

In addition, for example, in a case where the series of processing is executed by software, a program that constitutes the software is installed in a computer or the like from a network or a recording medium.

The computer may be a computer provided with dedicated hardware. In addition, the computer may be a computer that can execute various functions by installing various programs.

In addition, the recording medium including the program is constituted by not only a removable medium that is distributed separately from a device main body so as to provide a user with the program, but also a recording medium that is provided to the user in a state of being provided in the device main body in advance. For example, the removable medium is constituted by a magnetic disk (including a floppy disk), a blue-ray disk, an optical disc, a magneto-optical disc, or the like. For example, the optical disc is constituted by a compact disk read only memory (CD-ROM), a digital versatile disk (DVD), or the like. The magneto-optical disc is constituted by a mini-disk (MD) or the like. In addition, for example, the recording medium that is provided to a user in a state of being provided in the device main body in advance is constituted by a hard disk that is included in the storage unit 11 in FIG. 2, the storage unit 21 in FIG. 4, the storage unit 31 in FIG. 5, and the storage unit 41 in FIG. 6, or the like.

EXPLANATION OF REFERENCE NUMERALS

100 MOBILE BODY DISTRIBUTION SITUATION FORECAST SYSTEM
1 SERVER SYSTEM
10 CONTROL UNIT
101 RECEPTION UNIT
102 MOBILE BODY MOVEMENT INFORMATION SPECIFYING UNIT
103 INTER-FACILITY MOVEMENT COMPUTATION UNIT
104 MOBILE BODY DISTRIBUTION SITUATION FORECAST UNIT
105 FORECAST SITUATION OUTPUT UNIT
11 STORAGE UNIT
111 MAP INFORMATION AREA
112 FACILITY INFORMATION AREA
1121 FACILITY INFORMATION DATABASE
113 MOBILE BODY INFORMATION AREA
114 CONNECTION HISTORY INFORMATION AREA
115 FACILITY MOVEMENT CORRELATION INFORMATION AREA
1151 MOVEMENT INFORMATION DATABASE
1152 MOVEMENT CORRELATION DATABASE
1153 MOBILE BODY DEPARTURE/ARRIVAL TABLE
12 COMMUNICATION UNIT
14 DISPLAY UNIT
15 INPUT UNIT
2 ONBOARD NAVIGATION DEVICE
20 CONTROL UNIT
201 CONNECTION PROCESSING UNIT
202 POSITION INFORMATION UPDATING UNIT
205 ROUTE GUIDING UNIT
21 STORAGE UNIT
22 RADIO UNIT
23 SENSOR UNIT
24 DISPLAY UNIT
25 INPUT UNIT
3 PORTABLE TERMINAL
30 CONTROL UNIT
300 PORTABLE TERMINAL_CONNECTION INFORMATION ACQUISITION UNIT
301 PORTABLE TERMINAL_CONNECTION PROCESSING UNIT
302 PORTABLE TERMINAL_POSITION INFORMATION UPDATING UNIT
305 PORTABLE TERMINAL_ROUTE GUIDING UNIT
31 STORAGE UNIT
32 RADIO UNIT
33 SENSOR UNIT
34 DISPLAY UNIT
35 INPUT UNIT
4 DISTRIBUTION SITUATION DISPLAY TERMINAL
40 CONTROL UNIT
401 LOG-IN PROCESSING UNIT
403 MOBILE BODY DISTRIBUTION SITUATION ACQUISITION UNIT
404 MOBILE BODY DISTRIBUTION SITUATION DISPLAY UNIT
41 STORAGE UNIT
411 MOBILE BODY DISTRIBUTION FORECAST SITUATION STORAGE AREA 411
42 COMMUNICATION UNIT
44 DISPLAY UNIT
45 INPUT UNIT
5 VEHICLE
6 MOBILE BODY
7 COMMUNICATION NETWORK

The invention claimed is:
1. A mobile body distribution situation forecast device comprising:
an inter-facility movement computation unit that computes an estimated facility staying time, an estimated inter-facility movement time, and an inter-facility movement correlation on the basis of a trend of past position information from a mobile body, a plurality of pieces of facility information, and map information including a road map;

a position information reception unit that receives current position information of a plurality of the mobile bodies; and a mobile body situation forecast unit that forecasts a mobile body distribution situation after a predetermined time on the basis of the inter-facility movement correlation and the current position information of the plurality of mobile bodies, the mobile body distribution situation being of mobile bodies in excursion toward a facility set as a destination from another facility.

2. The mobile body distribution situation forecast device according to claim 1, further comprising:

a forecast situation output unit that expresses the forecasted mobile body distribution situation after a predetermined time in a mesh shape, and outputs the forecasted mobile body distribution situation in a state of being superimposed on the road map.

3. The mobile body distribution situation forecast device according to claim 1, wherein the inter-facility movement computation unit further computes the estimated facility staying time, the estimated inter-facility movement time, and the inter-facility movement correlation for every type of the mobile body, and the mobile body situation forecast unit further forecasts the mobile body distribution situation after a predetermined time for every type of the mobile body.

4. The mobile body distribution situation forecast device according to claim 3, wherein the mobile body is a vehicle, and the type of the mobile body is a vehicle type.

5. A mobile body distribution situation forecast method that is executed by a mobile body distribution situation forecast device, the method comprising:

an inter-facility movement computation step of computing an estimated facility staying time, an estimated inter-facility movement time, and an inter-facility movement correlation on the basis of a trend of past position information from a mobile body, a plurality of pieces of facility information, and map information including a road map;

a position information reception step of receiving current position information of a plurality of the mobile bodies; and a mobile body situation forecast step of forecasting a mobile body distribution situation after a predetermined time on the basis of the inter-facility movement correlation and the current position information of the plurality of mobile bodies, the mobile body distribution situation being of mobile bodies in excursion toward a facility set as a destination from another facility.

6. The mobile body distribution situation forecast method according to claim 5, further comprising:

an output step of expressing the mobile body distribution situation after a predetermined time which is forecasted in the mobile body situation forecast step in a mesh shape, and outputting the forecasted mobile body distribution situation in a state of being superimposed on the road map by the mobile body distribution situation forecast device.

7. The mobile body distribution situation forecast method according to claim 5, wherein the mobile body distribution situation forecast device further computes the estimated facility staying time, the estimated inter-facility movement time, and the inter-facility movement correlation for every type of the mobile body in the inter-facility movement computation step, and further forecasts the mobile body distribution situation after a predetermined time for every type of the mobile body in the mobile body situation forecast step.

8. The mobile body distribution situation forecast method according to claim 7, wherein the mobile body is a vehicle, and the type of the mobile body is a vehicle type.

* * * * *